US012658085B2

(12) United States Patent
Lee

(10) Patent No.: US 12,658,085 B2

(45) Date of Patent: Jun. 16, 2026

(54) DISPLAY APPARATUS

(71) Applicant: Samsung Display Co., Ltd., Yongin-si (KR)

(72) Inventor: Seungjun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/071,328

(22) Filed: Mar. 5, 2025

(65) Prior Publication Data

US 2025/0372015 A1 Dec. 4, 2025

(30) Foreign Application Priority Data

May 31, 2024 (KR) ........................ 10-2024-0071788

(51) Int. Cl.

*G09G 3/00* (2006.01)

*G09G 3/3233* (2016.01)

(52) U.S. Cl.

CPC ........... *G09G 3/035* (2020.08); *G09G 3/3233* (2013.01); *G09G 2300/0426* (2013.01); *G09G 2300/0819* (2013.01); *G09G 2300/0842* (2013.01); *G09G 2310/08* (2013.01); *G09G 2320/0233* (2013.01); *G09G 2320/0242* (2013.01)

(58) Field of Classification Search

None

See application file for complete search history.

(56) References Cited

U.S. PATENT DOCUMENTS

| | | | | |
|---|---|---|---|---|
| 9,563,320 | B2 | 2/2017 | Lee et al. | |
| 10,497,306 | B2 | 12/2019 | Lee | |
| 10,896,645 | B2 * | 1/2021 | Lee | G09G 3/3275 |
| 11,132,087 | B2 | 9/2021 | Lee et al. | |
| 11,417,257 | B2 | 8/2022 | You et al. | |
| 11,525,746 | B2 * | 12/2022 | Bok | G06F 1/1652 |
| 2015/0022515 | A1 * | 1/2015 | Ikeda | G09G 3/3275 345/212 |

(Continued)

FOREIGN PATENT DOCUMENTS

| | | | |
|---|---|---|---|
| CN | 111179752 | A | 5/2020 |
| KR | 10-2016-0025889 | A | 3/2016 |

(Continued)

OTHER PUBLICATIONS

International Search Report issued in corresponding PCT Application No. PCT/KR2025/007522, dated Sep. 9, 2025 (4 pages).

*Primary Examiner* — Dorothy Harris

(74) *Attorney, Agent, or Firm* — Womble Bond Dickinson (US) LLP

(57) ABSTRACT

A display apparatus includes: a substrate including a display area and a peripheral area outside the display area, wherein the substrate is foldable about a folding axis extending in a first direction across the display area; a plurality of pixels in the display area; a first voltage line in the peripheral area; a plurality of second voltage lines in the display area and electrically connected to the first voltage line and the plurality of pixels; a sensing wire adjacent to the folding axis in the display area; and a connection wire in the peripheral area and electrically connected to the sensing wire, wherein the sensing wire comprises a first end and a second end, the first end is electrically connected to the first voltage line, and the second end is electrically connected to the connection wire.

19 Claims, 28 Drawing Sheets

(56) References Cited

U.S. PATENT DOCUMENTS

| | | | | |
|---|---|---|---|---|
| 2016/0190216 | A1* | 6/2016 | Yang | G01B 7/18<br>257/40 |
| 2018/0102096 | A1* | 4/2018 | Lee | G09G 3/3266 |
| 2019/0378889 | A1* | 12/2019 | Choi | H10K 59/131 |
| 2021/0330261 | A1 | 10/2021 | Jung et al. | |
| 2021/0360099 | A1* | 11/2021 | You | H03K 17/964 |
| 2022/0214716 | A1* | 7/2022 | Kim | G06F 3/0443 |
| 2024/0053134 | A1* | 2/2024 | Nishimoto | G01L 1/16 |

FOREIGN PATENT DOCUMENTS

| | | | |
|---|---|---|---|
| KR | 10-2018-0031893 | A | 3/2018 |
| KR | 10-2020-0027598 | A | 3/2020 |
| KR | 10-2020-0143627 | A | 12/2020 |
| KR | 10-2021-0083151 | A | 7/2021 |
| KR | 10-2021-0131132 | A | 11/2021 |
| KR | 10-2022-0031483 | A | 3/2022 |
| KR | 10-2023-0084357 | A | 6/2023 |

* cited by examiner

DISPLAY APPARATUS

CROSS-REFERENCE TO RELATED APPLICATION

The present application claims priority to and the benefit of Korean Patent Application No. 10-2024-0071788, filed on May 31, 2024, in the Korean Intellectual Property Office, the entire disclosure of which is incorporated herein by reference.

BACKGROUND

1. Field

Aspects of some embodiments relate to a display apparatus, and more particularly, to a display apparatus having a foldable display panel.

2. Description of the Related Art

In general, as display apparatuses that visually display electrical signals develop, various display apparatuses with excellent characteristics such as being relatively thin, lightweight, and having relatively low power consumption are being introduced. For example, research and development on display apparatuses having foldable display panels are actively underway.

The above information disclosed in this Background section is only for enhancement of understanding of the background and therefore the information discussed in this Background section does not necessarily constitute prior art.

SUMMARY

Aspects of some embodiments relate to a display apparatus, and for example, to a display apparatus having a foldable display panel.

When folding or unfolding a display panel, the area where images are displayed may expand or contract. Additionally, for example, the luminance and color coordinates of pixels may change in areas where the display panel is curved. One or more embodiments include a display apparatus in which deformation of a display panel is detected to control the area where images are displayed and to compensate for the luminance and color coordinates of pixels. However, the above characteristics are merely examples, and the scope of embodiments according to the present disclosure is not limited by the above characteristics.

Additional aspects will be set forth in part in the description which follows and, in part, will be apparent from the description, or may be learned by practice of the presented embodiments of the disclosure.

According to one or more embodiments, a display apparatus includes a substrate including a display area and a peripheral area outside the display area, the substrate being foldable about a folding axis extending in a first direction across the display area, a plurality of pixels arranged in the display area, a first voltage line in the peripheral area, a plurality of second voltage lines in the display area and electrically connected to the first voltage line and the plurality of pixels, a sensing wire arranged adjacent to the folding axis in the display area, and a connection wire in the peripheral area and electrically connected to the sensing wire, wherein the sensing wire includes a first end and a second end, the first end is electrically connected to the first voltage line, and the second end is electrically connected to the connection wire.

According to some embodiments, the sensing wire may have a winding shape.

According to some embodiments, the sensing wire may include a wiring portion having a first width and a pattern portion having a second width greater than the first width.

According to some embodiments, each of the plurality of pixels may include a pixel circuit including transistors and a light-emitting diode electrically connected to the pixel circuit, and the light-emitting diode may include a pixel electrode, an opposite electrode on the pixel electrode, and an emission layer arranged between the pixel electrode and the opposite electrode.

According to some embodiments, the pixel circuit may include a driving transistor electrically connecting a power line to the pixel electrode, a data write transistor electrically connecting a data line to the driving transistor, and a first initialization transistor electrically connecting one of the plurality of second voltage lines to a gate of the driving transistor.

According to some embodiments, the pixel circuit may include a driving transistor electrically connecting a power line to the pixel electrode, a data write transistor electrically connecting a data line to the driving transistor, and a second initialization transistor electrically connecting one of the second voltage lines to the pixel electrode.

According to some embodiments, the first voltage line may include a first power voltage line electrically connected to the power line or a second power voltage line electrically connected to the opposite electrode.

According to some embodiments, the second voltage lines may extend in a second direction intersecting the first direction, and the display apparatus may further include a plurality of third voltage lines extending in the first direction and electrically connected to the plurality of second voltage lines.

According to some embodiments, the sensing wire may be directly connected to one of the plurality of second voltage lines or one of the plurality of third voltage lines.

According to some embodiments, the sensing wire may be stretchable and include a material having resistance that changes according to a stretch length.

According to some embodiments, the sensing wire may include conductive nanoparticles and an elastomer.

According to some embodiments, the display apparatus may further include a display driving circuit configured to drive the plurality of pixels, and a sensing circuit electrically connected to the connection wire and configured to detect a folding state by comparing a measured voltage of the sensing wire with a reference voltage, wherein the display driving circuit includes a data driver configured to supply a data signal to the plurality of pixels, a gate driver configured to supply scan signals to the plurality of pixels, a timing controller configured to control an operation timing of the data driver and the gate driver by using a vertical synchronization signal, and a voltage generator configured to supply the reference voltage and a first voltage.

According to some embodiments, the sensing circuit may include a memory storing a lookup table, a comparator configured to compare the measured voltage with the reference voltage and output a first value when the measured voltage is less than or equal to the reference voltage and outputs a second value when the measured voltage is greater than the reference voltage, a first controller configured to detect the folding state based on an output value of the comparator and generate sensing data including the folding state, and a second controller configured to generate a display control signal that controls the plurality of pixels based on the lookup table and the sensing data.

According to some embodiments, the first controller may be configured to output a voltage control signal that changes the reference voltage based on the output value of the comparator.

According to some embodiments, the sensing circuit may further include a switch configured to electrically connect the sensing wire to an input terminal of the comparator during an on-voltage period of a switch control signal and electrically disconnect the sensing wire from the input terminal of the comparator during an off-voltage period of the switch control signal.

According to some embodiments, the on-voltage period of the switch control signal may overlap an on-voltage period of the vertical synchronization signal.

According to some embodiments, the display control signal may include an image control signal configured to rearrange an image displayed by the plurality of pixels according to the folding state.

According to some embodiments, the display control signal may include an image quality control signal configured to compensate for color coordinates or luminance of the plurality of pixels according to the folding state.

According to one or more embodiments, a display apparatus includes a substrate including a display area and a peripheral area outside the display area, the substrate being foldable about a first folding axis and a second folding axis which extend in a first direction across the display area, a plurality of pixels arranged in the display area, a first voltage line in the peripheral area, a plurality of second voltage lines in the display area and electrically connected to the first voltage line and the plurality of pixels, a first sensing wire adjacent to the first folding axis in the display area, a second sensing wire arranged adjacent to the second folding axis in the display area, a first connection wire in the peripheral area and electrically connected to the first sensing wire, and a second connection wire in the peripheral area and electrically connected to the second sensing wire, wherein a first end of the first sensing wire is electrically connected to the first voltage line, and a second end of the first sensing wire is electrically connected to the first connection wire, and a first end of the second sensing wire is electrically connected to the first voltage line and a second end of the second sensing wire is electrically connected to the second connection wire.

According to some embodiments, the display apparatus may further include a display driving circuit configured to drive the plurality of pixels by using a vertical synchronization signal, and a sensing circuit electrically connected to the first connection wire and the second connection wire, and configured to detect a folding state of the substrate by comparing, during an on-voltage period of the vertical synchronization signal, a measured voltage of the first sensing wire with a first reference voltage, and comparing a measured voltage of the second sensing wire with a second reference voltage.

Other aspects, features and characteristics in addition to those described above will become more apparent from the following drawings, claims and detailed description of the disclosure.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1A:
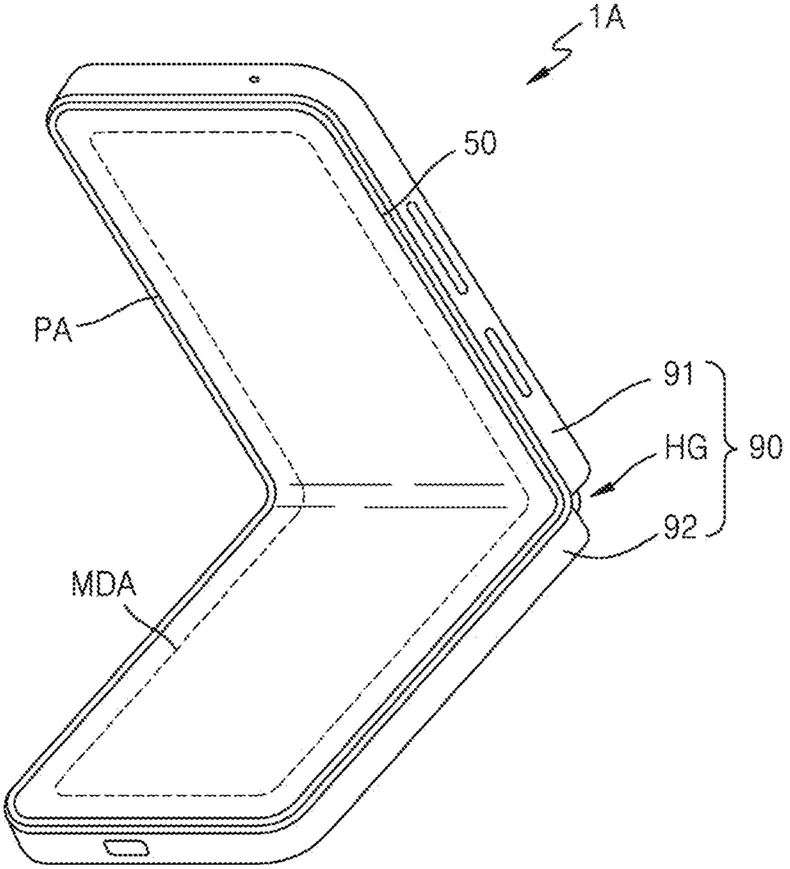
FIGS. 1A, 1B, and 1C are each a perspective view schematically illustrating an electronic device according to some embodiments.

Reference will now be made in more detail to aspects of some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, particular embodiments will be illustrated in the drawings and described in detail in the written description. The effects and features of the disclosure, and ways to achieve them will become apparent by referring to embodiments that will be described later in detail with reference to the drawings. However, the disclosure is not limited to the following embodiments but may be embodied in various forms.

Hereinafter, embodiments of the disclosure will be described in detail with reference to the accompanying drawings, and in the description with reference to the drawings, like reference numerals refer to like elements and redundant descriptions thereof will be omitted.

In the present specification, it will be understood that although the terms “first,” “second,” etc. may be used herein to describe various elements, these elements should not be limited by these terms. These terms are only used to distinguish one element from another.

In the present specification, singular expressions, unless defined otherwise in contexts, include plural expressions.

In the present specification, it will be further understood that the terms “comprise” and/or “have” used herein specify the presence of stated features or elements, but do not preclude the presence or addition of one or more other features or elements.

Herein, it will be understood when a portion such as a layer, an area, or an element is referred to as being “on” or “above” another portion, it may be directly on or above the other portion, or intervening portion may also be present.

In the present specification, when layers, regions, or elements are described as being connected, other layers, this indicates a case where layers, regions, and elements are directly connected or/and a case where layers, regions, and elements are indirectly connected with other layers, regions, and elements therebetween. For example, herein, when layers, regions, or elements are described as being electrically connected, this indicates a case where layers, regions, and elements are directly electrically connected and/or a case where layers, regions, and elements are indirectly electrically connected with other layers, regions, and elements therebetween.

Herein, an x-direction, a y-direction, and a z-direction are not limited to directions along the three axes of the Cartesian coordinate system, and may be interpreted in a broad sense including these. For example, the x-direction, y-direction, and z-direction may be orthogonal to each other, but may also refer to different directions that are not orthogonal to each other.

In this specification, “on a plane” indicates that a target part is viewed from above (for example, viewed in a direction perpendicular to an upper surface of a substrate), and “on a cross-section” indicates that a target part is viewed from a side on a cross-section cut vertically.

In this specification, a first component “overlapping” a second component indicates that the first component is located above or below the second component and the two components at least partially overlap each other on a plane.

Herein, “ON” used in connection with the state of an element may refer to an activated state of the element, and “OFF” may refer to a deactivated state of the element. “On,” as used in connection with a signal received by an element, may refer to a signal that activates the element, and “off” may refer to a signal that deactivates the element. An element may be activated by a high-level voltage or a low-level voltage. For example, a P-channel transistor (P-type transistor) is activated by a low-level voltage, and an N-channel transistor (N-type transistor) is activated by a high-level voltage. Thus, it should be understood that an “on” voltage for the P-type transistor and that of the N-type transistor are opposite voltage levels (low vs. high).

When an embodiment is implementable in another manner, a certain process order may be different from a described one. For example, two processes that are consecutively described may be substantially simultaneously performed or may be performed in an opposite order to the described order.

Also, in the drawings, for convenience of description, sizes of elements may be exaggerated or contracted. For example, because sizes and thicknesses of elements in the drawings are arbitrarily illustrated for convenience of explanation, the following embodiments are not limited thereto.

Figure 1B:
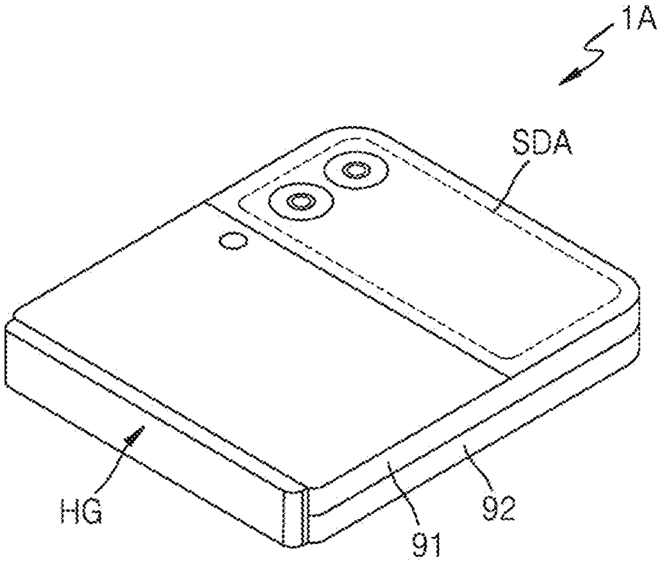
Figure 1C:
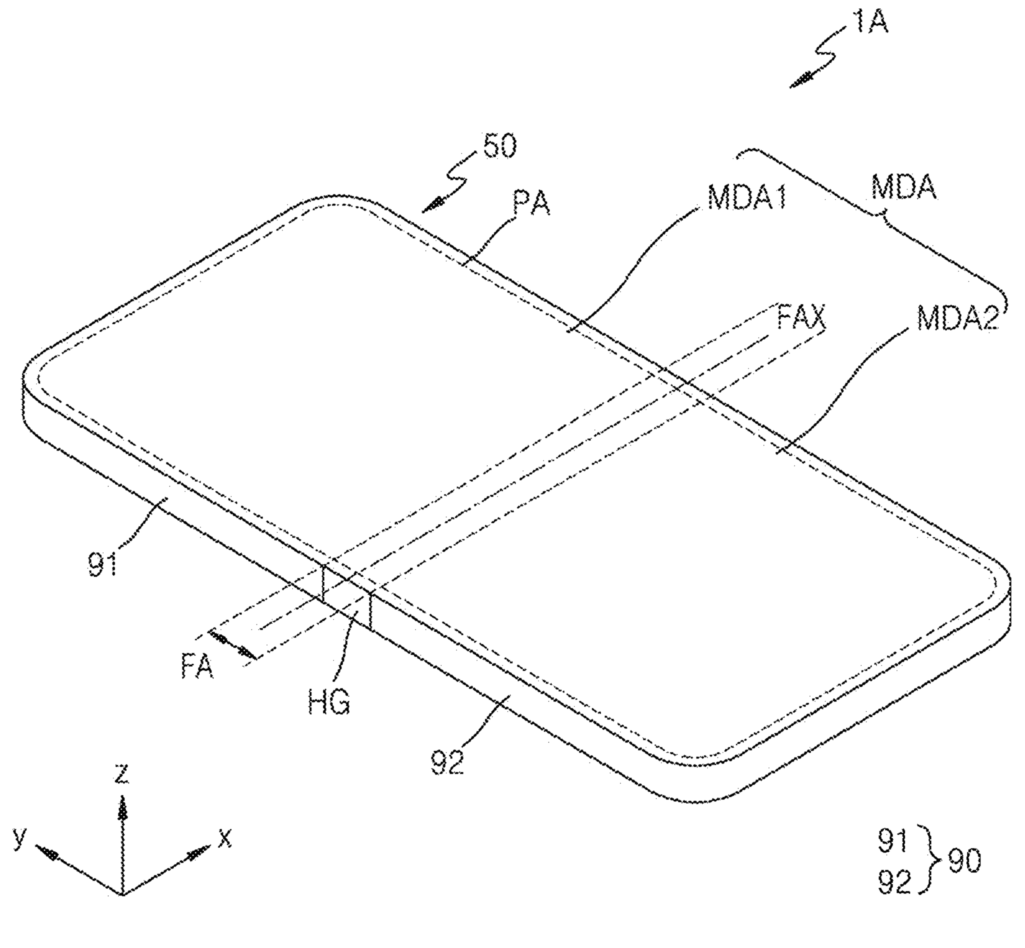

FIGS. 1A, 1B, and 1C are each a perspective view schematically illustrating an electronic device according to some embodiments.

FIG. 1A is a perspective view illustrating an electronic device 1A in a state folded at an angle of approximately 90 degrees, FIG. 1B is a perspective view illustrating the electronic device 1A in a folded state, and FIG. 1C is a perspective view illustrating the electronic device 1A in a completely unfolded state.

Referring to FIGS. 1A, 1B, and 1C, the electronic device 1A according to some embodiments may include a display apparatus 50 and a housing 90. The display apparatus 50 may include a main display area MDA where images are displayed, a sub-display area SDA, and a peripheral area PA arranged around the main display area MDA. Pixels P having display elements may be arranged in the main display area MDA and the sub-display area SDA. The pixels P may be spaced apart from each other according to a certain arrangement in each of the main display area MDA and the sub-display area SDA. An area of the main display area MDA may be larger than an area of the sub-display area SDA. According to some embodiments, the sub-display area SDA may be omitted. The display apparatus 50 may display images by using light emitted from the pixels P arranged in the main display area MDA and the sub-display area SDA. The peripheral area PA may be a type of non-display area where pixels P are not arranged.

The housing 90 may form the exterior of the electronic device 1A. The housing 90 may include plastic, metal, etc. The housing 90 may include a first portion 91 and a second portion 92 that support the display apparatus 50. The housing 90 may include a hinge HG between the first portion 91 and the second portion 92. The electronic device 1A may be folded or unfolded near the hinge HG.

For example, the main display area MDA may include a first main display area MDA1 located in the first portion 91 of the housing 90 and a second main display area MDA2 located in the second portion 92 of the housing 90. A folding axis FAX that overlaps the hinge HG may be located between the first main display area MDA1 and the second main display area MDA2. The display apparatus 50 may be folded or unfolded with respect to the folding axis FAX.

As illustrated in FIGS. 1A and 1B, the first main display area MDA1 and the second main display area MDA2 may be folded to face each other (in-folding) with respect to the folding axis FAX. According to some embodiments, the first main display area MDA1 and the second main display area MDA2 may be folded such that they do not face each other with respect to the folding axis FAX. For example, the first main display area MDA1 and the second main display area MDA2 may each be folded to face outward (out-folding).

The electronic device 1A may display different images for each display area according to a folding state. As illustrated in FIG. 1B, when the electronic device 1A is completely folded, a user may only use the sub-display area SDA located on the outside. In this case, the electronic device 1A may not display images in the main display area MDA, but may display images only in the sub-display area SDA. When the electronic device 1A is only partially folded as illustrated in FIG. 1A, the first main display area MDA1 and the second main display area MDA2 may display different images. When the electronic device 1A is fully unfolded as illustrated in FIG. 1C, images may be displayed in an expanded state throughout the first main display area MDA1 and the second main display area MDA2. The electronic device 1A may automatically control images by detecting changes in the folding state.

Referring to FIGS. 1A, 1B, and 1C, the electronic device 1A may include devices that display moving images or still images, and may be used as a display screen for mobile phones, smart phones, tablet personal computers (PCs), mobile communication terminals, electronic notebooks, e-books, portable multimedia players (PMPs), navigation, and Ultra Mobile PCs (UMPC), and also for various products such as televisions, laptop computers, monitors, billboards, and the Internet of Things (IoT).

In addition to the display apparatus 50, the electronic device 1A may include a processor, memory, input module, audio module, communication module, camera module, battery module, etc. within the housing 90. At least one of these components may be omitted or added. According to some embodiments, some of these components may be integrated into the display apparatus 50.

Figure 2:
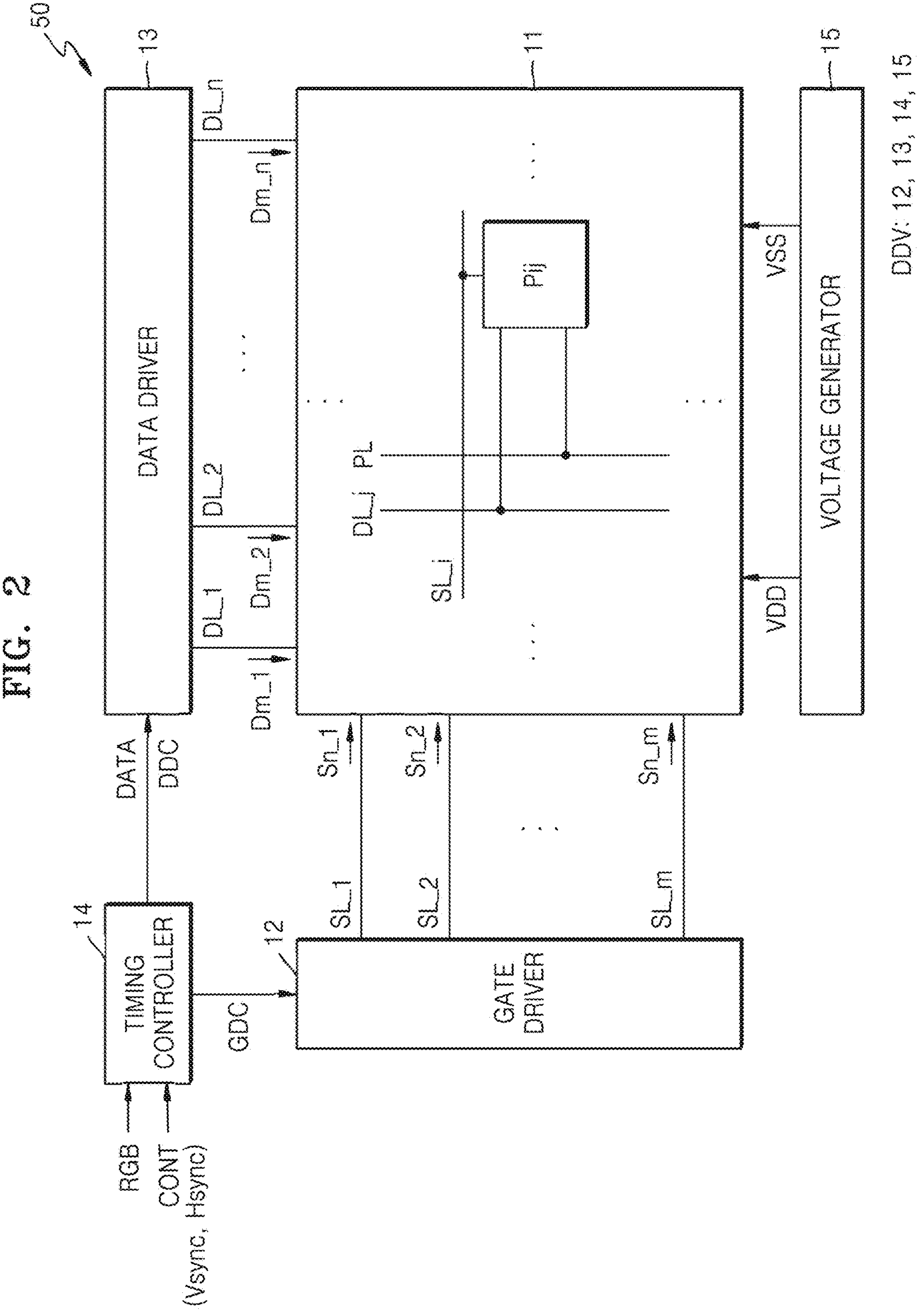
FIG. 2 is a diagram schematically illustrating a portion of an electronic device according to some embodiments.

FIG. 2 is a diagram schematically illustrating a portion of an electronic device according to some embodiments.

Referring to FIG. 2, the electronic device may include the display apparatus 50. The display apparatus 50 may include a display portion 11 and a display driving circuit DDV configured to drive the display portion 11. The display driving circuit DDV may include a gate driver 12, a data driver 13, a timing controller 14, and a voltage generator 15.

The display portion 11 may be arranged in the main display area (MDA, see FIG. 1A). FIG. 2 shows only the display portion 11 located in the main display area MDA, but the display apparatus 50 may further include a sub-display portion located in the sub-display area (SDA, see FIG. 1B).

The display portion 11 may include pixels P such as a pixel Pij located in an i-th row and a j-th column. Although FIG. 2 illustrates a single pixel P in the display portion 11, as a person having ordinary skill in the art would appreciate, the display portion 11 may include any suitable number of pixels according to the design and size of the display portion 11. According to some embodiments, the display apparatus 50 may include one or more display portions 11. For ease of understanding, only one pixel Pij is illustrated in the display portion 11 of FIG. 2, but m×n pixels P may be arranged, for example, in a matrix form or arrangement. Here, i is a natural number between 1 and m, and j is a natural number between 1 and n.

In FIG. 2, for illustrative purposes, the description will focus on a pixel P employing a pixel circuit including two transistors and one capacitor. However, the disclosure is not only applied to the pixel P employing the certain specific pixel circuit, but also to other pixel circuits, for example, a pixel P employing a pixel circuit including three transistors and one capacitor, or a pixel P employing a pixel circuit including seven transistors and one capacitor.

Each of the pixels P are connected to one of scan lines SL_1 to SL_m, one of data lines DL_1 to DL_n, and one of first power lines PL. For example, the pixel Pij located in the ith row and the jth column may be connected to the scan line SL_i, the data line DL_j, and the first power line PL.

The data lines DL_1 to DL_n may extend in a column direction of the pixels P (hereinafter referred to as a pixel column direction) and be connected to the pixels P located in the same column. The scan lines SL_1 to SL_m may extend in a row direction of the pixels P (hereinafter referred to as a pixel row direction) and be connected to the pixels P located in the same row.

The first power line PL may extend in the direction of the pixel column and be provided in plural numbers. Each first power line PL may be connected to the pixels P located in the same column.

Each of the scan lines SL_1 to SL_m may be configured to transmit the scan signals Sn_1 to Sn_m output from the gate driver 12, to the pixels P in the same row. Each of the data lines DL_1 to DL_n may be configured to transmit the data signals Dm_1 to Dm_n output from the data driver 13, to the pixels P in the same column. The pixel Pij located in the ith row and the jth column receives the scan signal Sn_i and the data signal Dm_j.

The first power line PL may be configured to deliver the first power voltage VDD output from the voltage generator 15 to the pixels P.

The pixel Pij may include a display element, a driving transistor that controls the amount of current flowing to the display element based on the data signal Dm_j, and a storage capacitor. The data signal Dm_j is output from the data driver 13 and received by the pixel Pij through the data line DL_j. The display element may include, for example, an organic light-emitting diode. As the display element emits light with a brightness corresponding to the magnitude of the current received from the driving transistor, the pixel Pij may express a gray level corresponding to the data signal Dm_j. In this specification, each pixel P may correspond to a portion of a unit pixel capable of displaying full color, for example, a subpixel.

The voltage generator 15 may generate voltages necessary to drive the pixel Pij. For example, the voltage generator 15 may generate a first power voltage (VDD, driving voltage) and a second power voltage (VSS, common voltage). A level of the first power voltage VDD may be higher than a level of the second power voltage VSS.

The voltage generator 15 may generate a first initialization voltage and a second initialization voltage and provide the first and second initialization voltages to the pixels P. The first initialization voltage may be applied to a gate of the driving transistor to initialize the gate of the driving transistor. The second initialization voltage may be applied to a pixel electrode (e.g., anode) of the display element to initialize the pixel electrode. The voltage generator 15 may generate a sustaining voltage and provide the same to the pixels P. The sustaining voltage may be applied to one electrode of the storage capacitor. The first power voltage VDD, the second power voltage VSS, the first initialization voltage, the second initialization voltage, and the sustaining voltage may be direct current (DC) voltages, direction and magnitude of which are kept constant. According to some embodiments, the first initialization voltage, the second initialization voltage, and the sustaining voltage may be omitted.

Additionally, the voltage generator 15 may generate a turn-on voltage and a turn-off voltage for controlling a switching transistor of the pixel Pij and provide the generated turn-on voltage and turn-off voltage to the gate driver 12. When a turn-on voltage is applied to a gate of the switching transistor, the switching transistor may be turned on, and when a turn-off voltage is applied to the gate of the switching transistor, the switching transistor may be turned off. The voltage generator 15 may generate gamma reference voltages and provide the same to the data driver 13.

The timing controller 14 may control the pixels P of the display portion 11 by controlling operation timings of the gate driver 12 and the data driver 13. The pixels P of the display portion 11 may receive a new data signal Dm for every frame period and display images corresponding to image source data RGB of one frame by emitting light with a luminance corresponding to the data signal Dm.

The timing controller 14 receives the image source data RGB and a control signal CONT from the outside. The timing controller 14 may convert the image source data RGB into image data DATA based on the characteristics of the display portion 11 and the pixels P. The timing controller 14 may provide the image data DATA to the data driver 13.

The control signal CONT may include a vertical synchronization signal Vsync, a horizontal synchronization signal Hsync, a data enable signal, a clock signal, etc. The vertical synchronization signal Vsync may define a start of a section (hereinafter, one frame period) in which video data DATA constituting one frame is written. The horizontal synchronization signal Hsync may define a start of a section in which image data constituting a horizontal line image displayed through one pixel row is written. The timing controller 14 may control the operation timings of the gate driver 12 and the data driver 13 by using the control signal CONT. The timing controller 14 may determine a frame period by counting data enable signals of a horizontal scanning period. The image source data RGB includes luminance information of the pixels P. The luminance may have a set number of gray levels, for example, 1024 ($=2^{10}$), 256 ($=2^8$), or 64 ($=2^6$).

The timing controller 14 may generate a gate timing control signal GDC for controlling the operation timing of the gate driver 12 and a data timing control signal DDC for controlling the operation timing of the data driver 13. According to some embodiments, the timing controller 14 may generate, by using the vertical synchronization signal Vsync, a switch control signal to control an operation timing of a sensing circuit that detects a folding state.

The gate timing control signal GDC may include a gate start pulse, a gate shift clock, and a gate output enable signal. The gate start pulse is supplied to the gate driver 12, which generates a first scan signal at a start point of a scan period. The gate shift clock is a clock signal commonly input to the gate driver 12 and is a clock signal for shifting the gate start pulse. The gate output enable signal controls output of the gate driver 12.

The data timing control signal may include a source start pulse, a source sampling clock, and a source output enable signal. The source start pulse may control a data sampling start point of the data driver 13 and be provided to the data driver 13 at a start of a scanning period. The source sampling clock is a clock signal that controls a sampling operation of data within the data driver 13 based on a rising or falling edge. The source output enable signal controls the output of the data driver 13. The source start pulse supplied to the data driver 13 may be omitted depending on a data transmission method.

The gate driver 12 sequentially generates scan signals Sn_1 to Sn_m in response to the gate timing control signal GDC supplied from the timing controller 14, by using a turn-on voltage or turn-off voltage provided from the voltage generator 15. The gate driver 12 may include a plurality of transistors and may be formed together with the pixels P through a thin film process. For example, the gate driver 12 may be mounted in the peripheral area PA of the display panel 10 in the form of an amorphous silicon TFT gate driver circuit (ASG) or an oxide semiconductor TFT gate driver circuit (OSG).

The data driver 13 samples and latches the image data DATA supplied from the timing controller 14 in response to a data timing control signal DDC supplied from the timing controller 14 and converts the sampled image data DATA into data in a parallel data system. When converting data in a parallel data system, the data driver 13 converts the image data DATA into a gamma reference voltage and converts the same into an analog data signal Dm. The data driver 13 provides data signals Dm_1 to Dm_n to the pixels P through the data lines DL_1 to DL_n. The pixels P receive data signals Dm_1 to Dm_n in response to the scan signals Sn_1 to Sn_m.

Figure 3:
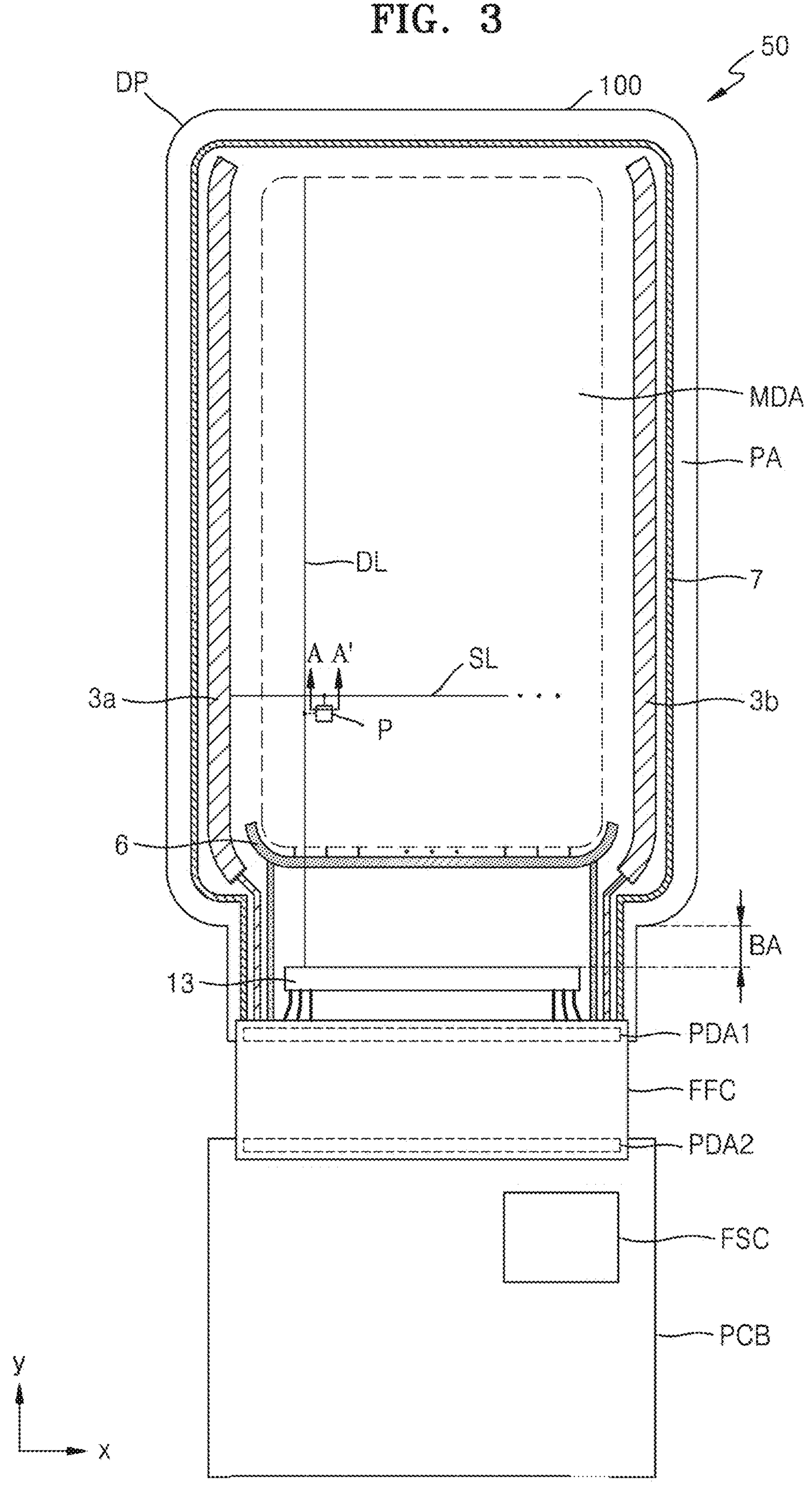
FIG. 3 is a plan view schematically illustrating a portion of a display apparatus according to some embodiments.

FIG. 3 is a plan view schematically illustrating a portion of a display apparatus according to some embodiments.

Referring to FIG. 3, the display apparatus 50 may include a display panel DP, a circuit board PCB, and a flexible film FFC connecting the display panel DP to the circuit board PCB. Although FIG. 3 shows only one display panel DP, according to some embodiments, the display apparatus 50 may further include a sub-display panel including a sub-display area (SDA, see FIG. 1B).

The display panel DP may include a main display area MDA in which a plurality of pixels P are located/and a peripheral area PA located outside the main display area MDA. The substrate 100 included in the display panel DP may be understood as having the main display area MDA and the peripheral area PA. According to some embodiments, the display panel DP may include a flexible display panel that is bendable, foldable, or rollable.

The substrate 100 may include various materials having flexible or bendable characteristics. For example, the substrate 100 may include a polymer resin such as polyethersulphone, polyacrylate, polyetherimide, polyethylene naphthalate, polyethylene terephthalate, polyphenylene sulfide, polyarylate, polyimide, polycarbonate, or cellulose acetate propionate. According to some embodiments, the substrate 100 may have a multilayer structure. For example, the substrate 100 may include two layers including a polymer resin and a barrier layer including an inorganic material between the layers.

A plurality of pixels P may be arranged in the main display area MDA. The pixels P may include a display element such as an organic light emitting diode and a pixel circuit electrically connected to the display element. Each pixel P may be configured to emit red, green, blue, or white light. Each pixel P may be electrically connected to external circuits and wires arranged in the peripheral area PA.

The gate driver 12 (see FIG. 2), the data driver 13, and wires may be located in the peripheral area PA. The gate driver 12 may include, with respect to the main display area MDA, a first gate driver 3*a* located on the left side (−x direction) of the peripheral area PA and a second gate driver 3*b* located on the right side (+x direction) of the peripheral area PA. The first gate driver 3*a* may be configured to transmit scan signals through scan lines SL to the pixels P located on the left side of a virtual center line that bisects the main display area MDA. The second gate driver 3*b* may be configured to transmit scan signals through the scan lines SL to pixels located on the right side of the virtual center line that bisects the main display area MDA. According to some embodiments, either the first gate driver 3*a* or the second gate driver 3*b* may be omitted.

The data driver 13 may be configured to transmit data signals to the pixels P through data lines DL. According to some embodiments, the data driver 13 may be a display driver integrated circuit (DDI). According to some embodiments, the data driver 13 may be a touch and display driver integrated circuit (TDDI). The data driver 13 may be mounted in the peripheral area PA adjacent to an edge of the substrate 100.

Wires arranged in the peripheral area PA may include a first power voltage line 6 and a second power voltage line 7. The first power voltage line 6 may be arranged to extend from below of the peripheral area PA (−y direction) in the first direction (x direction) with respect to the main display area MDA.

The second power voltage line 7 may be located in the peripheral area PA to surround a portion of the main display area MDA. The second power voltage line 7 may have a loop shape that is open on one side and extends along a border of the main display area MDA.

The peripheral area PA may include a first pad area PDA1 in which a plurality of pads are located. The plurality of pads are exposed without being covered by an insulating layer and may be electrically connected to a flexible film FFC. That is, the pads of the flexible film FFC may be electrically connected to the pads of the display panel DP.

For reference, FIG. 3 may be understood as a plan view illustrating the display apparatus 50 during the manufacturing process. In the electronic device 1A, which is a final one, a portion of the display panel DP may be bent to minimize or reduce the area of the non-display area. For example, the peripheral area PA may include a bending area BA located between the main display area MDA and the first pad area PDA1, and the substrate 100 may be bent in the bending area BA. When a side of the display panel DP, on which images are displayed, is referred to as a front surface, and a side facing the front surface is referred to as a rear surface, a portion of the peripheral area PA, the flexible film FFC, and the circuit board PCB may be located on the rear surface of the display panel DP.

A control circuit that controls the overall operation of the display apparatus 50 and the voltage generator 15 (see FIG. 2) may be mounted on the circuit board PCB. The circuit board PCB may be a printed circuit board. The circuit board PCB may include a second pad area PDA2 in which a plurality of pads are located. The plurality of pads are exposed without being covered by an insulating layer and may be electrically connected to the flexible film FFC. That is, the pads of the flexible film FFC may be electrically connected to the pads of the circuit board PCB.

A control signal generated in the control circuit and a voltage generated by the voltage generator 15 may be transmitted through the flexible film FFC to the first gate driver 3*a*, the second gate driver 3*b*, the data driver 13, and the wires. For example, the voltage generator 15 may be configured to transmit a first power voltage (VDD, see FIG. 2) to the first power voltage line 6 through corresponding pads, and transmit a second power voltage (VSS, see FIG. 2) to the second power voltage line 7.

According to some embodiments, a sensing circuit FSC may be mounted on the circuit board PCB. The sensing circuit FSC may be electrically connected to sensing wires located on the display panel DP and detect a folding state of the display panel DP by using changes in the electrical characteristics of the sensing wires, and transmit a control signal according to the folding state, to the display driving circuit DDV.

The flexible film FFC may be a flexible printed circuit board or a flexible cable. When the flexible film FFC is a flexible printed circuit board, the sensing circuit FSC may be mounted on the flexible film FFC. According to some embodiments, the sensing circuit FSC may be mounted in the peripheral area PA of the display panel DP. For example, the sensing circuit FSC may be provided integrally with the data driver 13.

Figure 4A:
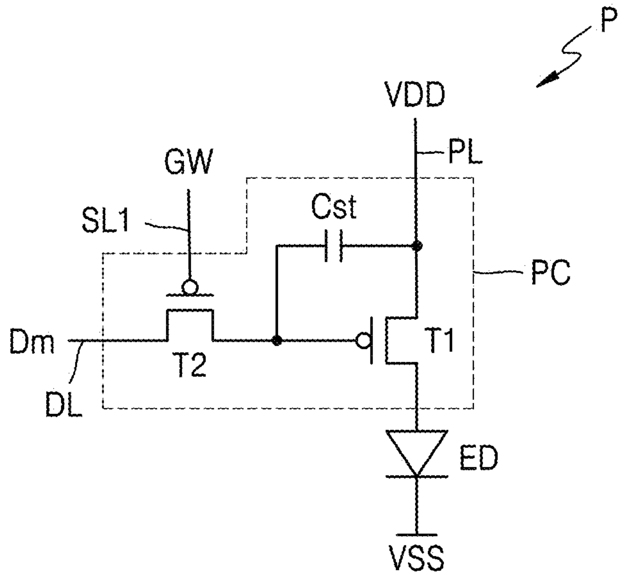
FIGS. 4A, 4B, and 4C each illustrate an equivalent circuit diagram of a pixel included in a display apparatus, according to some embodiments.
Figure 4B:
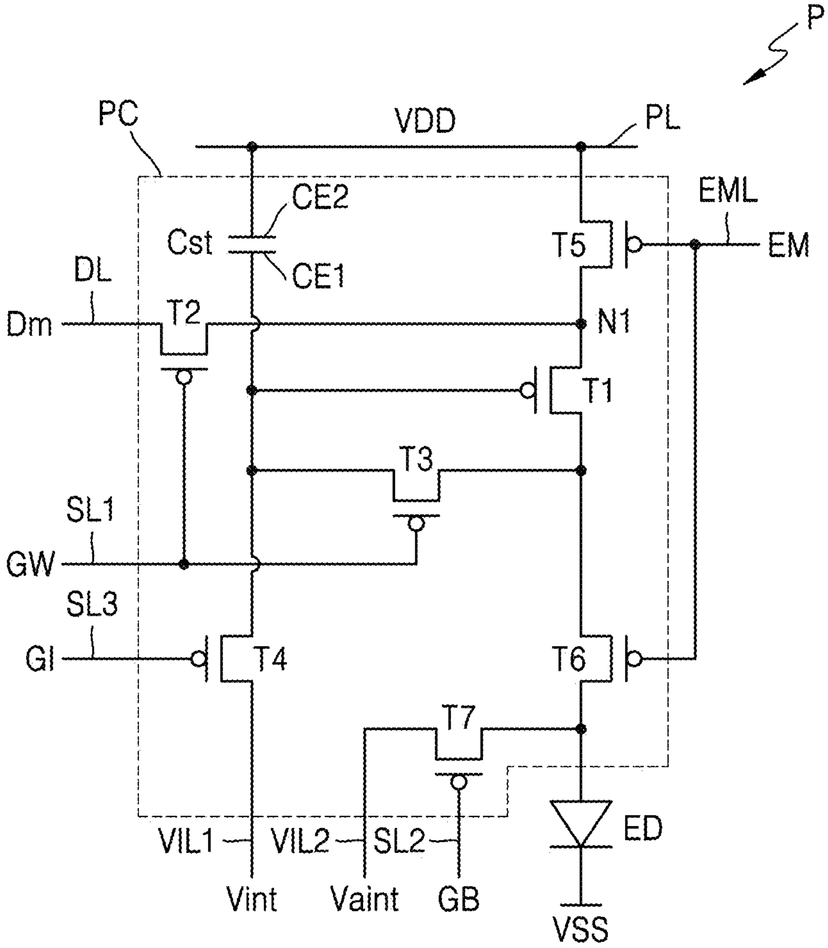
Figure 4C:
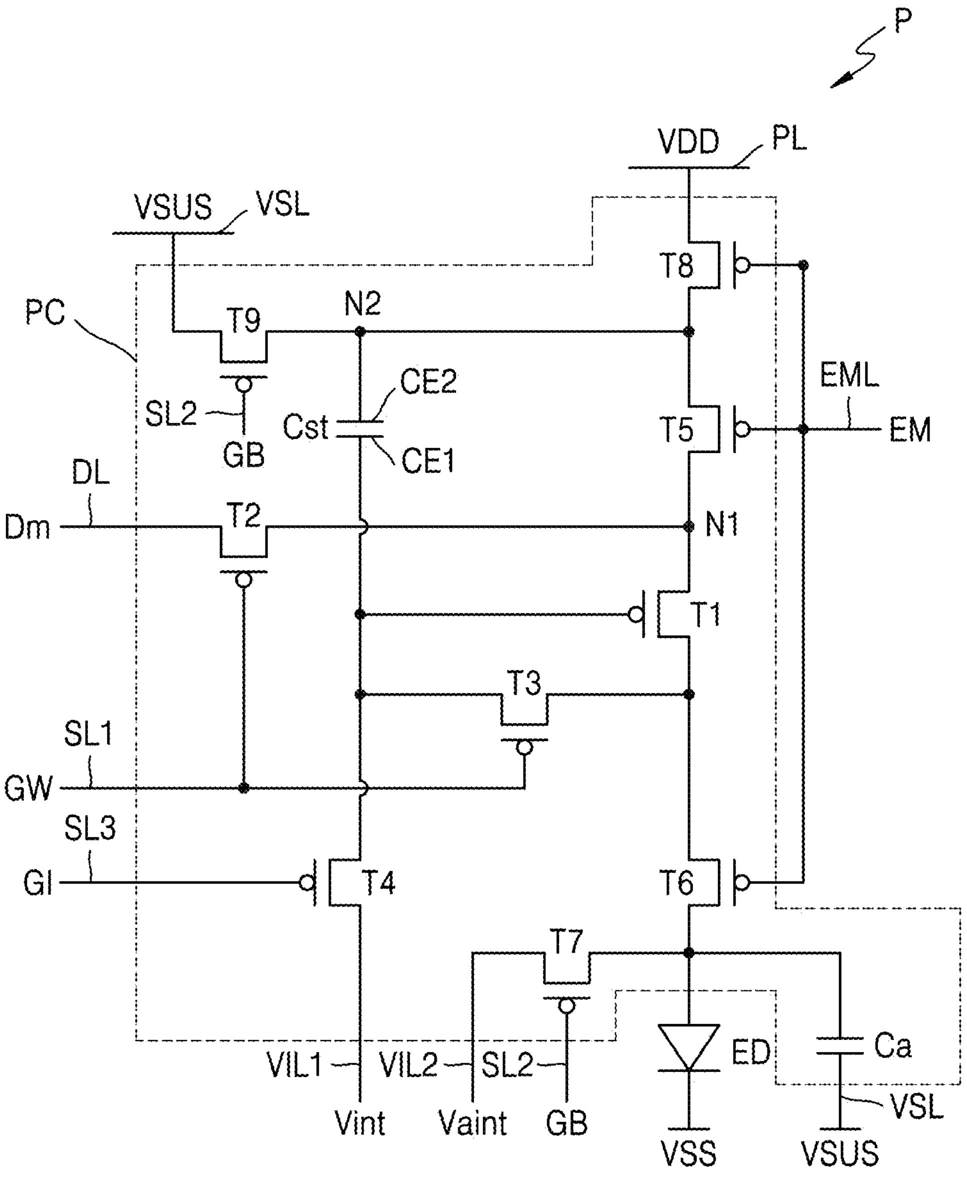

FIGS. 4A, 4B, and 4C each illustrate an equivalent circuit diagram of a pixel included in a display apparatus, according to some embodiments.

Referring to FIG. 4A, the pixel P (see FIG. 3) may include a display element ED and a pixel circuit PC electrically connected to the display element ED. The pixel circuit PC may include a first thin-film transistor T1, a second thin-film transistor T2, and a storage capacitor Cst. The pixel circuit PC may be electrically connected to signal lines and voltage lines. The signal lines may include a gate line such as the first scan line SL1 and a data line DL, and the voltage lines may include a first power line PL configured to transmit the first power voltage VDD.

The second transistor T2 may be electrically connected to the first scan line SL1 and the data line DL. The first scan line SL1 may provide a first scan signal GW to a gate electrode of the second transistor T2. The second transistor T2 may be a switching transistor that is turned on or off according to the first scan signal GW input from the first scan line SL1. The second transistor T2 may be electrically connected to the first transistor T1 and configured to transmit the data signal Dm input from the data line DL, to the first transistor T1.

The storage capacitor Cst may be electrically connected to the second transistor T2 and the first power line PL, and store a voltage corresponding to a difference between a voltage received from the second transistor T2 and the first power voltage VDD supplied through the first power line PL.

The first transistor T1 may be a driving transistor and control a driving current flowing through the display element ED. The first transistor T1 may be connected to the first power line PL and the storage capacitor Cst. The first transistor T1 may control the driving current flowing from the first power line PL to the display element ED, in response to a voltage value stored in the storage capacitor Cst. The display element ED may emit light with a certain brightness by the driving current. A pixel electrode (anode) of the display element ED may be electrically connected to the first transistor T1, and an opposite electrode (cathode) thereof may be connected to the second power voltage line (7, see FIG. 3) that supplies a second power voltage VSS (common power voltage).

FIG. 4A illustrates the pixel circuit PC including two transistors and one storage capacitor, but in other embodiments, the pixel circuit PC may include three or more transistors. Additionally, the pixel circuit PC may include additional components without departing from the spirit and scope of embodiments according to the present disclosure.

Referring to FIG. 4B, the pixel circuit PC may include a first transistor T1, a second transistor T2, a third transistor T3, a fourth transistor T4, a fifth transistor T5, a sixth transistor T6, a seventh transistor T7, and a storage capacitor Cst. The pixel circuit PC is electrically connected to signal lines and voltage lines. The signal lines may include a first scan line SL1, a second scan line SL2, a third scan line SL3, a gate line such as an emission control line EML, and a data line DL. The voltage lines may include a first initialization voltage line VIL1, a second initialization voltage line VIL2, and a first power line PL.

The first power line PL may be configured to transmit the first power voltage VDD to the first transistor T1. The first initialization voltage line VIL1 may be configured to transmit a first initialization voltage Vint, which initializes the first transistor T1, to the pixel circuit PC. The second initialization voltage line VIL2 may be configured to transmit a second initialization voltage Vaint, which initializes a first electrode of the display element ED, to the pixel circuit PC.

The first transistor T1 may be electrically connected to the first power line PL via the fifth transistor T5, and may be electrically connected to the display element ED via the sixth transistor T6. The first transistor T1 may act as a driving transistor and receive a data signal Dm according to a switching operation of the second transistor T2 and supply a driving current to the display element ED.

The second to seventh transistors T2 to T7 may be switching transistors that are turned on or off according to a gate-source voltage or a gate voltage.

The second transistor T2 is a data writing transistor and is electrically connected to the first scan line SL1 and the data line DL. The second transistor T2 is electrically connected to the first power line PL via the fifth transistor T5. The second transistor T2 may be turned on according to the first scan signal GW received through the first scan line SL1 and perform a switching operation of transmitting the data signal Dm transmitted through the data line DL, to a first node N1.

The third transistor T3 may be electrically connected to the first scan line SL1 and to the display element ED via the sixth transistor T6. The third transistor T3 may be turned on according to the first scan signal GW received through the first scan line SL1 to diode-connect the first transistor T1.

The fourth transistor T4 may be a first initialization transistor and be electrically connected to the third scan line SL3 and the first initialization voltage line VIL1. The fourth transistor T4 may be turned on according to a third scan signal GI received through the third scan line SL3 and transmit the first initialization voltage Vint from the first initialization voltage line VIL1 to a gate electrode of the first transistor T1 so as to initialize a voltage of the gate electrode of the first transistor T1. The third scan signal GI may correspond to a first scan signal of another pixel circuit arranged in a previous row of the corresponding pixel circuit PC.

The fifth transistor T5 may be an operation control transistor, and the sixth transistor T6 may be an emission control transistor. The fifth transistor T5 and the sixth transistor T6 may be electrically connected to the emission control line EML, and may be simultaneously turned on according to an emission control signal EM received through the emission control line EML, to form a current path so that the driving current may flow from the first power line PL to the display element ED.

The seventh transistor T7 may be a second initialization transistor and be electrically connected to the second scan line SL2, the second initialization voltage line VIL2, and the sixth transistor T6. The seventh transistor T7 may be turned on according to a second scan signal GB received through the second scan line SL2, and transmit the second initialization voltage Vaint from the second initialization voltage line VIL2, to a pixel electrode of the display element ED to initialize the pixel electrode of the display element ED.

The storage capacitor Cst may include a first capacitor electrode CE1 and a second capacitor electrode CE2. The first capacitor electrode CE1 may be electrically connected to the gate electrode of the first transistor T1, and the second capacitor electrode CE2 may be electrically connected to the first power line PL. The storage capacitor Cst may store and maintain a voltage corresponding to a voltage difference between the first power line PL and the gate electrode of the first transistor T1, thereby maintaining a voltage applied to the gate electrode of the first transistor T1. Although FIG. 4B illustrates various components in a pixel circuit PC, the pixel circuit PC may include additional components or fewer components without departing from the spirit and scope of embodiments according to the present disclosure.

Referring to FIG. 4C, the pixel circuit PC may include a first transistor T1, a second transistor T2, a third transistor T3, a fourth transistor T4, a fifth transistor T5, a sixth transistor T6, a seventh transistor T7, an eighth transistor T8, a ninth transistor T9, a storage capacitor Cst, and an auxiliary capacitor Ca.

The pixel circuit PC is electrically connected to signal lines and voltage lines. The signal lines may include a first scan line SL1, a second scan line SL2, a third scan line SL3, a gate line such as an emission control line EML, and a data line DL. The voltage lines may include first and second initialization voltage lines VIL1 and VIL2, a sustaining voltage lines VSL, and a first power line PL.

The first power line PL may be configured to transmit the first power voltage VDD to the first transistor T1. The first initialization voltage line VIL1 may be configured to transmit the first initialization voltage Vint, which initializes the first transistor T1, to the pixel circuit PC. The second initialization voltage line VIL2 may be configured to transmit the second initialization voltage Vaint, which initializes the first electrode of the display element ED, to the pixel circuit PC. The sustaining voltage line VSL may be configured to provide a sustaining voltage VSUS to a second node N2, for example, the second capacitor electrode CE2 of the storage capacitor Cst during an initialization section and a data writing section.

The first transistor T1 may be electrically connected to the first power line PL via the fifth transistor T5 and the eighth transistor T8, and may be electrically connected to the display element ED via the sixth transistor T6. The first transistor T1 may act as a driving transistor and receive a data signal Dm according to a switching operation of the second transistor T2 and supply a driving current to the display element ED.

The second to ninth transistors T2 to T9 may be switching transistors that are turned on or off according to a gate-source voltage or a gate voltage.

The second transistor T2 may be electrically connected to the first scan line SL1 and the data line DL, and electrically connected to the first power line PL via the fifth transistor T5 and the eighth transistor T8. The second transistor T2 may be turned on according to the first scan signal GW received through the first scan line SL1 and perform a switching operation of transmitting the data signal Dm transmitted through the data line DL, to the first node N1.

The third transistor T3 may be electrically connected to the first scan line SL1 and to the display element ED via the sixth transistor T6. The third transistor T3 may be turned on according to the first scan signal GW received through the first scan line SL1 and diode-connect the first transistor T1, thereby compensating for a threshold voltage of the first transistor T1.

The fourth transistor T4 may be electrically connected to the third scan line SL3 and the first initialization voltage line VIL1, and be turned on according to the third scan signal GI received through the third scan line SL3 and configured to transmit the first initialization voltage Vint from the first initialization voltage line VIL1, to the gate electrode of the first transistor T1 so as to initialize a voltage of the gate electrode of the first transistor T1. The third scan signal GI may correspond to a first scan signal of another pixel circuit arranged in a previous row of the corresponding pixel circuit PC.

The fifth transistor T5, the sixth transistor T6, and the eighth transistor T8 may be electrically connected to the emission control line EML, and may be simultaneously turned on according to the emission control signal EM received through the emission control line EML to form a current path so that the driving current may flow from the first power line PL to the display element ED.

The seventh transistor T7 may be a second initialization transistor and be electrically connected to the second scan line SL2, the second initialization voltage line VIL2, the sixth transistor T6, and the display element ED. The seventh transistor T7 may be turned on according to the second scan signal GB received through the second scan line SL2, and configured to transmit the second initialization voltage Vaint from the second initialization voltage line VIL2, to the first electrode of the display element ED so as to initialize the pixel electrode of the display element ED.

The ninth transistor T9 may be electrically connected to the second scan line SL2, the second capacitor electrode CE2 of the storage capacitor Cst, and the sustaining voltage line VSL. The ninth transistor T9 may be turned on according to the second scan signal GB received through the second scan line SL2, and may be configured to transmit the sustaining voltage VSUS to the second node N2, for example, the second capacitor electrode CE2 of the storage capacitor Cst, in an initialization period and a data writing section.

The eighth transistor T8 and the ninth transistor T9 may each be electrically connected to the second node N2, for example, the second capacitor electrode CE2 of the storage capacitor Cst. In some embodiments, the eighth transistor T8 may be turned off and the ninth transistor T9 may be turned on in the initialization section and the data writing section, and in an emission section, the eighth transistor T8 may be turned on and the ninth transistor T9 may be turned off. In the initialization section and the data writing section, as the sustaining voltage VSUS is transmitted to the second node N2, and thus, luminance uniformity (e.g., Long Range Uniformity (LRU)) of a display apparatus according to a voltage drop of the first power line PL may be relatively improved.

The storage capacitor Cst may include a first capacitor electrode CE1 and a second capacitor electrode CE2. The first capacitor electrode CE1 may be electrically connected to the gate electrode of the first transistor T1, and the second capacitor electrode CE2 may be electrically connected to the eighth transistor T8 and the ninth transistor T9.

The auxiliary capacitor Ca may be electrically connected to the sixth transistor T6, the sustaining voltage line VSL, and the pixel electrode of the display element ED. The auxiliary capacitor Ca may prevent or reduce an increase in black luminance when the sixth transistor T6 is turned off, by storing and maintaining a voltage corresponding to a voltage difference between the pixel electrode of the display element ED and the sustaining voltage line VSL while the seventh transistor T7 and the ninth transistor T9 are turned on.

The first power voltage VDD, the second power voltage VSS, the first initialization voltage Vint, the second initialization voltage Vaint, and the sustaining voltage VSUS may be voltages supplied to the pixel circuit PC, which are maintained constant in direction and magnitude. Although FIG. 4C illustrates various components in a pixel circuit PC, the pixel circuit PC may include additional components or fewer components without departing from the spirit and scope of embodiments according to the present disclosure.

Figure 5:
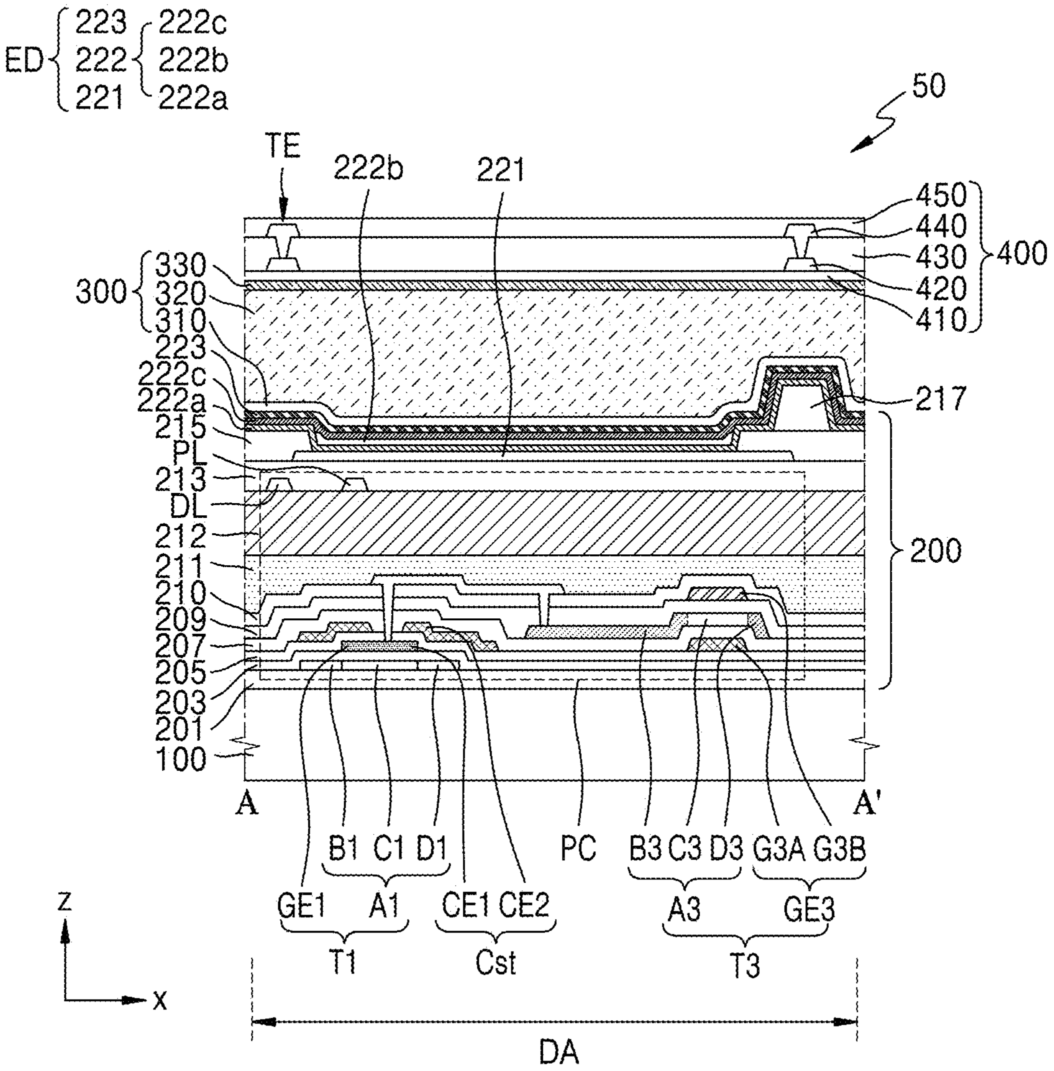
FIG. 5 is a cross-sectional view schematically illustrating a portion of a display apparatus according to some embodiments.

FIG. 5 is a cross-sectional view schematically illustrating a portion of a display apparatus according to some embodiments.

Referring to FIG. 5, the display apparatus 50 may include a substrate 100, a display layer 200, an encapsulation layer 300, and an input sensing layer 400. The display layer 200 may include a pixel circuit PC located in the display area DA and a display element ED electrically connected to the pixel circuit PC. The pixel circuit PC may include a first transistor T1, a third transistor T3, and a storage capacitor Cst.

A buffer layer 201 may include an inorganic insulating material such as silicon oxide, silicon nitride, or silicon oxynitride, and may include a single-layer or multi-layer structure including the above-described inorganic insulating material. The buffer layer 201 may block penetration of impurities from the substrate 100 and provide a flat base surface to the components on the buffer layer 201.

A first semiconductor layer A1 of the first transistor T1 may be located on the buffer layer 201. The first semiconductor layer A1 may include a silicon-based semiconductor material, such as amorphous silicon or poly silicon. The first semiconductor layer A1 may include a channel region C1 and a first region B1 and a second region D1 located on both sides of the channel region C1. The first region B1 and the second region D1 may be regions including impurities at a higher concentration than those of the channel region C1, and one of the first region B1 and the second region D1 may be a source region, and the other one may be a drain region.

A first gate insulating layer 203 may be located on the first semiconductor layer A1. The first gate insulating layer 203 may include an inorganic insulating material such as silicon oxide, silicon nitride, or silicon oxynitride, and may include a single-layer or multi-layer structure including the above-described inorganic insulating material.

The first transistor T1 may include a gate electrode (hereinafter referred to as a first gate electrode GE1) overlapping the channel region C1 of the first semiconductor layer A1. The first gate electrode GE1 may include a conductive material including molybdenum (Mo), aluminum (Al), copper (Cu), and titanium (Ti), and may include a single layer or a multi-layered structure.

The storage capacitor Cst may include a first capacitor electrode CE1 and a second capacitor electrode CE2 that overlap each other. According to some embodiments, the first capacitor electrode CE1 of the storage capacitor Cst may include the first gate electrode GE1. In other words, the first gate electrode GE1 may include the first capacitor electrode CE1. For example, the first gate electrode GE1 and the first capacitor electrode CE1 of the storage capacitor Cst may be formed integrally.

A first interlayer insulating layer 205 may be arranged between the first capacitor electrode CE1 and the second capacitor electrode CE2 of the storage capacitor Cst. The first interlayer insulating layer 205 may include an inorganic insulating material such as silicon oxide, silicon nitride, or silicon oxynitride, and may include a single-layer or multi-layer structure including the above-described inorganic insulating material.

The second capacitor electrode CE2 of the storage capacitor Cst may include a conductive material including molybdenum (Mo), aluminum (Al), copper (Cu), titanium (Ti), etc., and may include a single-layer or multi-layer structure including the above-described inorganic insulating material.

A second interlayer insulating layer 207 may be located on the storage capacitor Cst. The second interlayer insulating layer 207 may include an inorganic insulating material such as silicon oxide, silicon nitride, or silicon oxynitride, and may include a single-layer or multi-layer structure including the above-described inorganic insulating material.

A semiconductor layer of the third transistor T3 (hereinafter referred to as a third semiconductor layer A3) may be located on the second interlayer insulating layer 207. The third semiconductor layer A3 may include an oxide-based semiconductor material. For example, the third semiconductor layer A3 may include a Zn oxide-based material, such as Zn oxide, In—Zn oxide, Ga—In—Zn oxide, etc. In some embodiments, the third semiconductor layer A3 may include an In—Ga—Zn—O (IGZO), an In—Sn—Zn—O (ITZO), or In—Ga—Sn—Zn—O (IGTZO) semiconductor including, in ZnO, a metal such as indium (In) and gallium (Ga), tin (Sn).

The third semiconductor layer A3 may include a channel region C3 and a first region B3 and a second region D3 located on both sides of the channel region C3. One of the first region B3 and the second region D3 may be a source region and the other may be a drain region.

The third transistor T3 may include a gate electrode (hereinafter referred to as a third gate electrode GE3) overlapping the channel region C3 of the third semiconductor layer A3. The third gate electrode GE3 may have a double gate structure including a lower gate electrode G3A located below the third semiconductor layer A3 and an upper gate electrode G3B located above the channel region C3.

The lower gate electrode G3A may be located on the same layer as the second capacitor electrode CE2 of the storage capacitor Cst. For example, the lower gate electrode G3A may be arranged between the first interlayer insulating layer 205 and the second interlayer insulating layer 207. The lower gate electrode G3A may include the same material as that of the second capacitor electrode CE2 of the storage capacitor Cst.

The upper gate electrode G3B may be located on the third semiconductor layer A3 with the second gate insulating layer 209 therebetween. The second gate insulating layer 209 may include an inorganic insulating material such as silicon oxide, silicon nitride, or silicon oxynitride, and may include a single-layer or multi-layer structure including the above-described inorganic insulating material.

The third interlayer insulating layer 210 may be located on the upper gate electrode G3B. The third interlayer insulating layer 210 may include an inorganic insulating material such as silicon oxide, silicon nitride, or silicon oxynitride, and may include a single-layer or multi-layer structure including the above-described inorganic insulating material.

A first organic insulating layer 211, a second organic insulating layer 212, and a third organic insulating layer 213 may be sequentially stacked on the third interlayer insulating layer 210. The first organic insulating layer 211, the second organic insulating layer 212, and the third organic insulating layer 213 may include an organic insulating material. The organic insulating material may include acrylic, benzocyclobutene (BCB), polyimide, or hexamethyldisiloxane (HMDSO). Some of the first organic insulating layer 211, the second organic insulating layer 212, and the third organic insulating layer 213 may be omitted.

Conductive layers may be respectively arranged between the third interlayer insulating layer 210 and the first organic insulating layer 211, between the first organic insulating layer 211 and the second organic insulating layer 212, and between the second organic insulating layer 212 and the third organic insulating layer 213. The conductive layers may include signal wires and/or connection electrodes that electrically connect the pixel circuit PC to the display element ED. For example, the data line DL and the first power line PL may be arranged between the second organic insulating layer 212 and the third organic insulating layer 213. Each of the conductive layers may include a conductive material including molybdenum (Mo), aluminum (Al), copper (Cu), titanium (Ti), etc., and may have a single-layer or multi-layer structure including the above-described materials. According to some embodiments, each of the data line DL and the first power line PL may have a three-layer structure of titanium layer/aluminum layer/titanium layer.

The display element ED may be located on the third organic insulating layer 213. According to some embodiments, the display element ED may include an organic light-emitting diode including a pixel electrode 221, an opposite electrode 223, and an intermediate layer 222 arranged between the pixel electrode 221 and the opposite electrode 223.

The pixel electrode 221 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound thereof. According to some embodiments, the pixel electrode 221 may further include a conductive oxide layer above and/or below the above-described reflective layer. The conductive oxide layer may include indium tin oxide (ITO), indium zinc oxide (IZO), zinc oxide (ZnO), indium oxide ($In_2O_3$), indium gallium oxide (IGO), indium gallium oxide and/or aluminum zinc oxide (AZO). According to some embodiments, the pixel electrode 221 may have a three-layer structure of ITO layer/Ag layer/ITO layer.

A bank layer 215 may be located on the pixel electrode 221. The bank layer 215 may include an opening that overlaps the pixel electrode 221 and may cover edges of the pixel electrode 221. The bank layer 215 may include an organic insulating material such as polyimide.

The intermediate layer 222 may include an emission layer 222*b*. The intermediate layer 222 may include a first functional layer 222*a* located below the emission layer 222*b* and/or a second functional layer 222*c* located above the emission layer 222*b*. The emission layer 222*b* may include a polymer or low-molecular organic material, which emits light of a certain color. The first functional layer 222*a* may include a hole transport layer. Alternatively, the first functional layer 222*a* may include a hole injection layer and a hole transport layer. The second functional layer 222*c* may include an electron transport layer (ETL) and/or an electron injection layer (EIL).

The opposite electrode 223 may include a conductive material with a low work function. For example, the opposite electrode 223 may include a (semi) transparent layer including Ag, Mg, Al, Pt, Pd, Au, Ni, Nd, Ir, Cr, Li, Ca, or an alloy thereof. Alternatively, the opposite electrode 223 may further include a layer such as ITO, IZO, ZnO or $In_2O_3$ on the (semi) transparent layer including the above-described material.

The emission layer 222*b* may be patterned to overlap the pixel electrode 221 through the opening of the bank layer 215. On the other hand, the first functional layer 222*a*, the second functional layer 222*c*, and the opposite electrode 223 may entirely cover the display area DA.

A spacer 217 may be formed on the bank layer 215. The spacer 217 may be formed together with the bank layer 215 in the same process, or may be formed individually in a separate process. According to some embodiments, the spacer 217 may include an organic insulating material such as polyimide. Alternatively, the bank layer 215 may include an organic insulating material including a light-blocking dye, and the spacer 217 may include an organic insulating material such as polyimide.

The display element ED may be covered with the encapsulation layer 300. The encapsulation layer 300 may include at least one organic encapsulation layer and at least one inorganic encapsulation layer. According to some embodiments, FIG. 4 illustrates the encapsulation layer 300 including a first inorganic encapsulation layer 310, a second inorganic encapsulation layer 330, and an organic encapsulation layer 320 therebetween.

The first inorganic encapsulation layer 310 and the second inorganic encapsulation layer 330 may each include at least one inorganic material selected from the group consisting of aluminum oxide, titanium oxide, tantalum oxide, hafnium oxide, zinc oxide, silicon oxide, silicon nitride, and silicon oxynitride. The first inorganic encapsulation layer 310 and the second inorganic encapsulation layer 330 may include a single layer or multilayer containing the above-described materials. The organic encapsulation layer 320 may include a polymer-based material. The polymer-based material may include an acrylic resin, an epoxy-based resin, polyimide, polyethylene, and the like. According to some embodiments, the organic encapsulation layer 320 may include acrylate.

The input sensing layer 400 may be located on the encapsulation layer 300. The input sensing layer 400 may include touch electrodes TE located in the display area DA and at least one touch insulating layer. In this regard, FIG. 5 illustrates the input sensing layer 400 including a first touch insulating layer 410 on the second inorganic encapsulation layer 330, a first conductive line 420 on the first touch insulating layer 410, a second touch insulating layer 430 on the first conductive line 420, a second conductive line 440 on the second touch insulating layer 430, and a third touch insulating layer 450 on the second conductive line 440.

The first touch insulating layer 410, the second touch insulating layer 430, and the third touch insulating layer 450 may each include an inorganic insulating material and/or an organic insulating material. According to some embodiments, the first touch insulating layer 410 and the second touch insulating layer 430 may each include an inorganic insulating material such as silicon oxide, silicon nitride, and silicon oxynitride, and the third touch insulating layer 450 may include an organic insulating material. At least one of the first touch insulating layer 410, the second touch insulating layer 430, or the third touch insulating layer 450 may extend from the display area DA to the peripheral area PA.

The touch electrode TE of the input sensing layer 400 may include a structure in which the first conductive line 420 and the second conductive line 440 are connected to each other. Alternatively, the touch electrode TE may include either the first conductive line 420 or the second conductive line 440, and in this case, the second touch insulating layer 430 may be omitted.

The first conductive line 420 and the second conductive line 440 may each include aluminum (Al), copper (Cu), and/or titanium (Ti), and may be formed as a single layer or multilayer containing the above-described materials. For example, the first conductive line 420 and the second conductive line 440 may each have a three-layer structure of titanium layer/aluminum layer/titanium layer.

Figure 6:
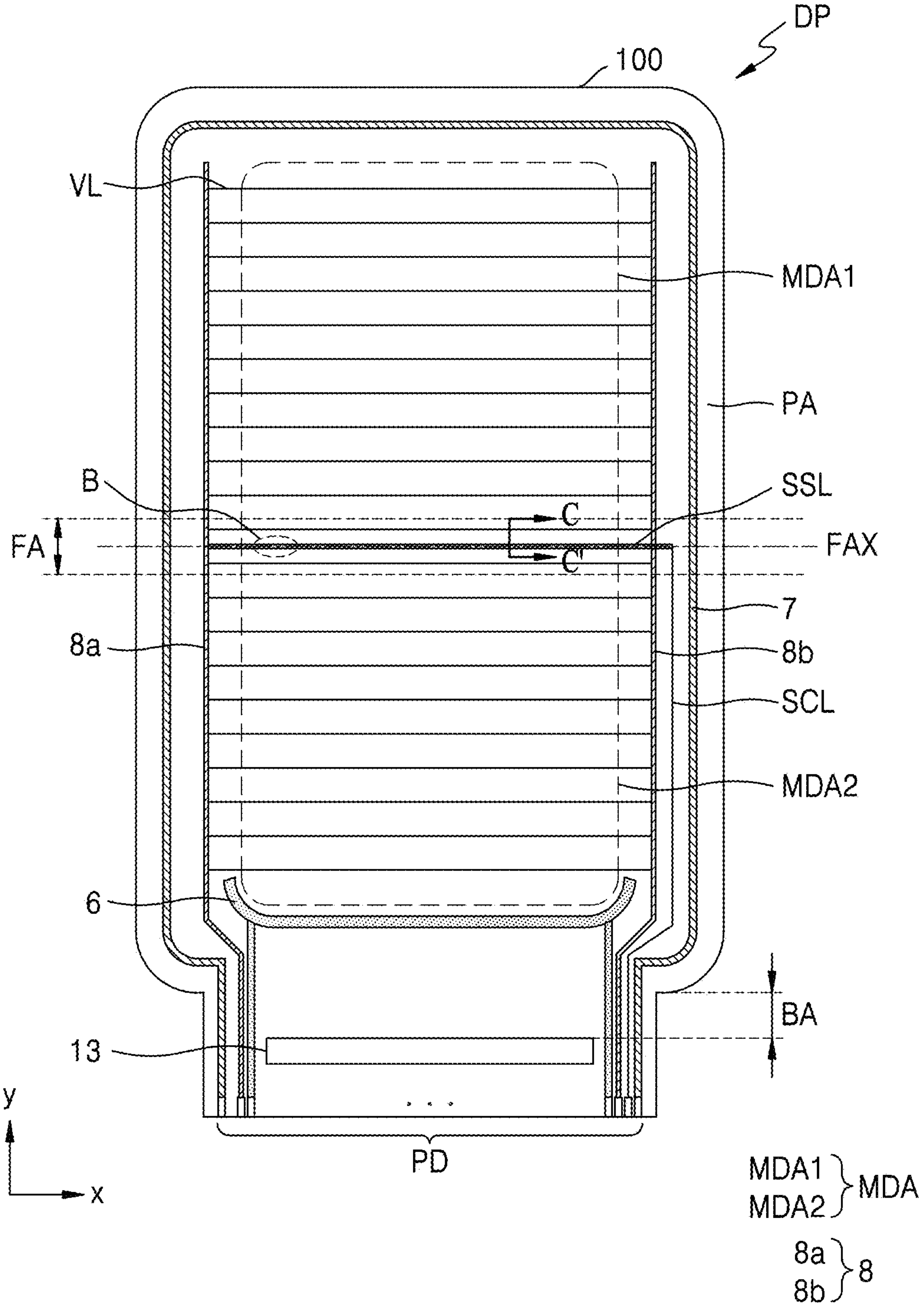
FIG. 6 is a plan view schematically illustrating a portion of a display apparatus according to some embodiments.

FIG. 6 is a plan view schematically illustrating a portion of a display apparatus according to some embodiments.

Referring to FIG. 6, a display apparatus according to some embodiments may include a display panel DP. The display panel DP may include a main display area MDA and a peripheral area PA outside the main display area MDA. Because the components of the display panel DP are located on the substrate 100, it may be regarded that the substrate 100 includes the main display area MDA and the peripheral area PA.

The display panel DP may be folded or unfolded with respect to a folding axis FAX extending in a first direction (x-direction) across the main display area MDA. The main display area MDA may be divided into a first main display area MDA1 and a second main display area MDA2 with respect to the folding axis FAX. The first main display area MDA1 and the second main display area MDA2 may be folded to face each other with respect to the folding axis FAX. Alternatively, the first main display area MDA1 and the second main display area MDA2 may each be folded to face outward with respect to the folding axis FAX.

The main display area MDA may include a folding area FA adjacent to the folding axis FAX. The folding area FA may include an area that increases or decreases when the display apparatus is folded or unfolded, and may be a portion of the first main display area MDA1 and a portion of the second main display area MDA2. The folding area FA may include an area where stress caused by deformation of the display panel DP is concentrated.

A sensing wire SSL may be arranged in the folding area FA. The sensing wire SSL may be located adjacent to the folding axis FAX and may extend approximately in the first direction (x-direction). That is, the sensing wire SSL may extend entirely in the first direction (x-direction), but may partially extend in other directions and have a winding shape. The sensing wire SSL may be arranged adjacent to the folding axis FAX. According to some embodiments, the sensing wire SSL may be arranged to overlap the folding axis FAX on a plane. The electrical characteristics of the sensing wire SSL, such as resistance, may change when the display panel DP is folded or unfolded.

According to some embodiments, the sensing wire SSL is stretchable and may include a conductive material whose resistance changes depending on the stretch length. The sensing wire SSL may include a material having stretchability, conductivity, and linearity. Here, linearity means that when the sensing wire SSL stretches or contracts, the changes in electrical characteristics of the sensing wire SSL is proportional to the elongation of the sensing wire SSL.

The sensing wire SSL may include conductive nanoparticles and elastomers. Conductive nanoparticles may include reduced graphene oxide (rGO), graphene, carbon nanotubes, metal nanoparticles, metal nanowires, conductive polymer particles, or mixtures thereof. An elastomer may include a silicone-based elastomer such as polydimethylsiloxane, a styrene-based elastomer, an olefin-based elastomer, polyurethane, or a mixture thereof. According to some embodiments, the elastomer may include a polymer nanofiber. Polymer nanofibers may include polyurethane, styrene-block-poly(ethylene butylene)-block-polystyrene, polystyrene, or polyvinyl chloride. The sensing wire SSL may have a composite elastomer structure including a conductive nanoparticle layer and an elastomer layer. The sensing wire SSL may include an elastomer layer mixed with a conductive nanoparticle layer or an elastomer layer coated with conductive nanoparticles.

According to some embodiments, a gauge factor of the sensing wire SSL may be about 10 GF to about 1,000 GF. If the gauge factor of the sensing wire SSL is less than 10 GF, changes in the electrical characteristics of the sensing wire SSL may not be measured when the display panel DP is folded or unfolded. If the gauge factor of the sensing wire SSL is greater than 1,000 GF, the electrical characteristics of the sensing wire SSL may change significantly even with a slight deformation of the display panel DP, and the sensing resolution may decrease.

In the peripheral area PA, the first power voltage line 6, the second power voltage line 7, the first voltage line 8, the connection wire SCL, the data driver 13, and the pads PD may be located. The first power voltage line 6 may be arranged to extend from below the peripheral area PA (−y direction) in the first direction (x direction) with respect to the main display area MDA. The second power voltage line 7 may be located in the peripheral area PA to surround a portion of the main display area MDA. For example, the second power voltage line 7 may have a loop shape that is open on one side and extends along a border of the main display area MDA. The connection wire SCL may extend in the second direction (y direction) along the border of the main display area MDA and may be arranged on one side of the peripheral area PA.

The first voltage line 8 may include a 1st-1 voltage line 8*a* and a 1st-2 voltage line 8*b*. The 1st-1 voltage line 8*a* and the 1st-2 voltage line 8*b* may be respectively located on both sides of the peripheral area PA with the main display area MDA therebetween, and extend in the second direction (y direction). According to some embodiments, the first voltage line 8 may be located on only one side of the peripheral area PA. For example, one of the 1st-1 voltage line 8*a* and the 1st-2 voltage line 8*b* may be omitted. According to some embodiments, the first voltage line 8 may further include a 1st-3 voltage line connecting the 1st-1 voltage line 8*a* to the 1st-2 voltage line 8*b*. In this case, the first voltage line 8 may have a loop shape with one side open extending along the border of the main display area MDA.

A plurality of second voltage lines VL may be located in the main display area MDA and electrically connect the first voltage line 8 to the pixels (P, see FIG. 3). For example, each of the second voltage lines VL may extend from the 1st-1 voltage line 8*a* through the main display area MDA to the 1st-2 voltage line 8*b*. The second voltage lines VL may be voltage lines that are electrically connected to the pixels P arranged in the same row and configured to transmit DC voltage to each pixel circuit (PC, see FIG. 4C).

Each of the first power voltage line 6, the second power voltage line 7, the first voltage line 8, and the connection wire SCL may be electrically connected to a corresponding pad PD. As described with reference to FIG. 3, the pads PD may be electrically connected to the pads of the flexible film FFC, and the flexible film FFC may be electrically connected to the circuit board PCB.

The first power voltage line 6, the second power voltage line 7, and the first voltage line 8 may be each electrically connected to the voltage generator 15 (see FIG. 2) located on the circuit board PCB through the corresponding pad PD. The first power voltage line 6 may be configured to receive the first power voltage (VDD, see FIG. 2) from the voltage generator 15. The second power voltage line 7 may be configured to receive the second power voltage (VSS, see FIG. 2) from the voltage generator 15. The first voltage line 8 may be configured to receive a DC voltage from the voltage generator 15. Here, the DC voltage may be voltages supplied to the pixel circuit PC, and may be one of the first initialization voltage (Vint, see FIG. 4B), the second initialization voltage (Vaint, see FIG. 4B), and the sustaining voltage (VSUS, see FIG. 4C).

According to some embodiments, the first voltage line 8 may be configured to receive the first initialization voltage Vint from the voltage generator 15. The second voltage lines VL may be components corresponding to the first initialization voltage line (VIL1, see FIG. 4B) configured to deliver the first initialization voltage Vint to the pixel circuits PC located in the same row. According to some embodiments, the first voltage line 8 may be configured to receive the second initialization voltage Vaint from the voltage generator 15. The second voltage lines VL may include the second initialization voltage lines VIL2 (see FIG. 4B) configured to transmit the second initialization voltage Vaint to the pixel circuits PC located in the same row. According to some embodiments, the first voltage line 8 may receive the sustaining voltage VSUS from the voltage generator 15. The second voltage lines VL may be sustaining voltage lines (VSL, see FIG. 4C) configured to transmit the sustaining voltage VSUS to the pixel circuits PC located in the same row.

The sensing wire SSL may include a first end and a second end. A first end of the sensing wire SSL may be electrically connected to the first voltage line 8, and a second end thereof may be electrically connected to the connection wire SCL. According to some embodiments, the first end of the sensing wire SSL may be electrically connected to the 1st-1 voltage line 8*a* on the left side of the peripheral area PA (−x direction) with respect to the main display area MDA. The second end of the sensing wire SSL may be electrically connected to the connection wire SCL located on the right side of the peripheral area PA (+x direction). According to some embodiments, the first end of the sensing wire SSL may be connected to the 1st-2 voltage line 8*b* on the right side of the peripheral area PA (+x direction) with respect to the main display area MDA. The second end of the sensing wire SSL may be electrically connected to the connection wire SCL located on the left side of the peripheral area PA (−x direction). According to some embodiments, the first end of the sensing wire SSL may be electrically connected to one of the second voltage lines VL in the main display area MDA. That is, the sensing wire SSL may be configured to receive a sensing driving voltage through the first voltage line 8 or the second voltage line VL electrically connected to the first voltage line 8.

The connection wire SCL may be electrically connected to the sensing circuit (FSC, see FIG. 3) through a corresponding pad PD. The sensing circuit FSC may be configured to measure changes in the electrical characteristics of the sensing wire SSL, detect a folding state of the display panel DP, and generate a display control signal that controls the pixels P based on the detected folding state.

The sensing circuit FSC may be configured to compare the measured voltage of the sensing wire SSL with a reference voltage, detect the folding state of the display panel DP, and generate a display control signal for controlling the pixels P according to the folding state of the display panel DP.

Because the sensing wire SSL is configured to receive a sensing driving voltage from the first voltage line 8 configured to transmit a DC voltage to the pixel P, separate wiring and circuits required to transmit the sensing driving voltage to the sensing wire SSL may be omitted. Accordingly, the area required by a folding detection sensor for detecting the folding state of the display panel DP may be relatively reduced. Additionally, by simplifying the structure of the folding detection sensor, manufacturing costs may be relatively reduced.

Figure 7A:
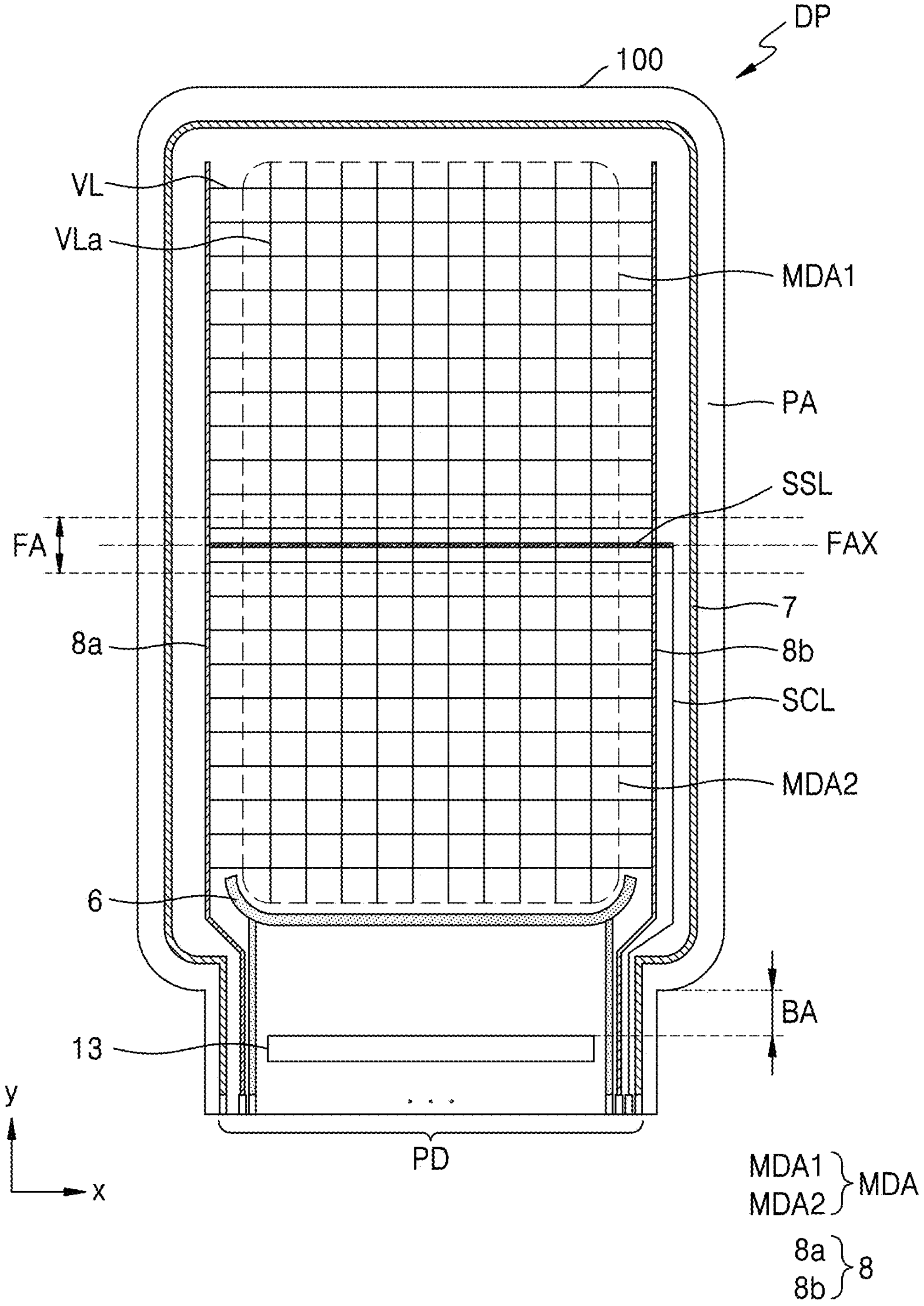
FIGS. 7A and 7B are plan views schematically illustrating a portion of a display apparatus according to some embodiments.
Figure 7B:
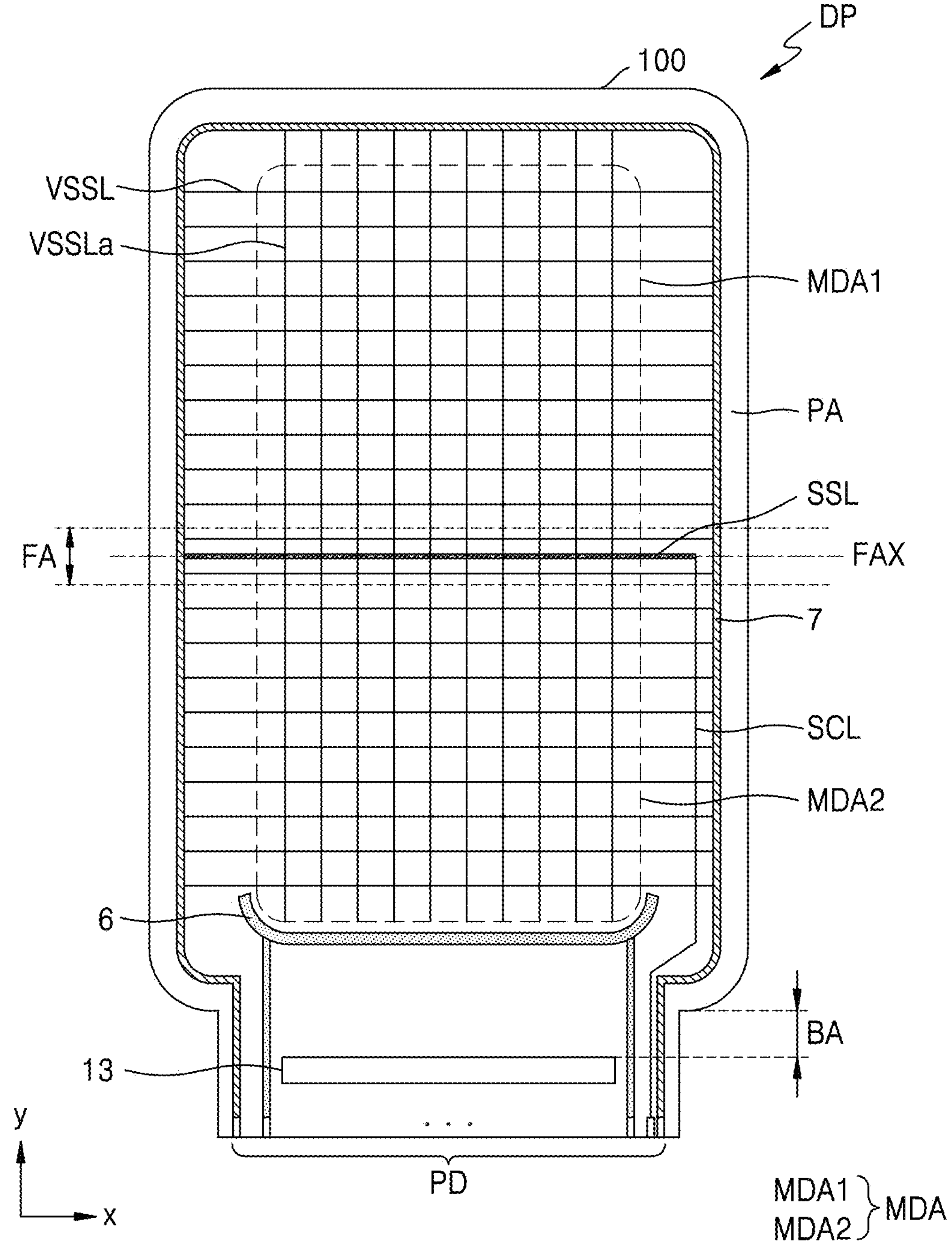

FIGS. 7A and 7B are each a plan view schematically illustrating a portion of a display apparatus according to some embodiments.

The display apparatus illustrated in FIG. 7A is similar to FIG. 6, but differs in that third voltage lines VLa are further included. The display apparatus illustrated in FIG. 7B is similar to FIG. 6, but there is a difference in that the sensing wire SSL is electrically connected to the second power voltage line 7. Hereinafter, description of identical or similar components will be omitted and description will focus on differences.

Referring to FIG. 7A, the display apparatus may include a display panel DP. The display panel DP may extend in the second direction (y direction) and may further include a plurality of third voltage lines VLa located in the main display area MDA. In the main display area MDA, the second voltage lines VL and the third voltage lines VLa may intersect each other to form a mesh structure. In the main display area MDA, the second voltage lines VL and the third voltage lines VLa may be electrically connected to each other to prevent or reduce a voltage drop in a DC voltage.

The first end of the sensing wire SSL may be electrically connected to the first voltage line 8, and the second end thereof may be electrically connected to the connection wire SCL. The first end of the sensing wire SSL may be electrically connected to the 1st-1 voltage line 8*a* on the left side of the peripheral area PA (−x direction) with respect to the main display area MDA. The second end of the sensing wire SSL may be electrically connected to the connection wire SCL located on the right side of the peripheral area PA (+x direction). According to some embodiments, the first end of the sensing wire SSL may be electrically connected to the second voltage line VL or the third voltage line VLa in the main display area MDA.

That is, the sensing wire SSL may be configured to receive a sensing driving voltage through the first voltage line 8, the second voltage line VL, or the third voltage line VLa. As described above, the sensing driving voltage may include one of the first initialization voltage (Vint, see FIG. 4B), the second initialization voltage (Vaint, see FIG. 4B), and the sustaining voltage (VSUS, see FIG. 4C).

Referring to FIG. 7B, the display panel DP may further include second power lines VSSL extending from the main display area MDA in the first direction (x direction) and first auxiliary power lines VSSLa extending in the second direction (y direction) in the main display area MDA. In the main display area MDA, the second power lines VSSL and the first auxiliary power lines VSSLa may intersect each other to form a mesh structure. In the main display area MDA, the second power lines VSSL and the first auxiliary power lines VSSLa may be electrically connected to each other, and the second power lines VSSL or the first auxiliary power lines VSSLa may be electrically connected to the opposite electrode 223 (see FIG. 5) of the display element (ED, see FIG. 4A). The mesh structure formed by the second power lines VSSL and the first auxiliary power line VSSLa may prevent or reduce a voltage drop of the second power voltage (VSS, see FIG. 2).

The first end of the sensing wire SSL may be electrically connected to the second power voltage line 7, and the second end thereof may be electrically connected to the connection wire SCL. According to some embodiments, the first end of the sensing wire SSL may be electrically connected to the second power line VSSL or the first auxiliary power line VSSLa in the main display area MDA. The second end of the sensing wire SSL may be electrically connected to the connection wire SCL located in the peripheral area PA. The sensing wire SSL may be configured to receive a sensing driving voltage through the second power voltage line 7, the second power line VSSL, or the first auxiliary power line VSSLa. The sensing driving voltage transmitted to the sensing wire SSL may be the second power supply voltage (VSS, see FIG. 2).

According to some embodiments, the first end of the sensing wire SSL may be electrically connected to the first power voltage line 6 or the first power line (PL, see FIG. 2), and the second end of the sensing wire SSL may be electrically connected to the connection wire SCL. In this case, the sensing driving voltage transmitted to the sensing wire SSL may be the first power supply voltage (VDD, see FIG. 2).

Figure 8:
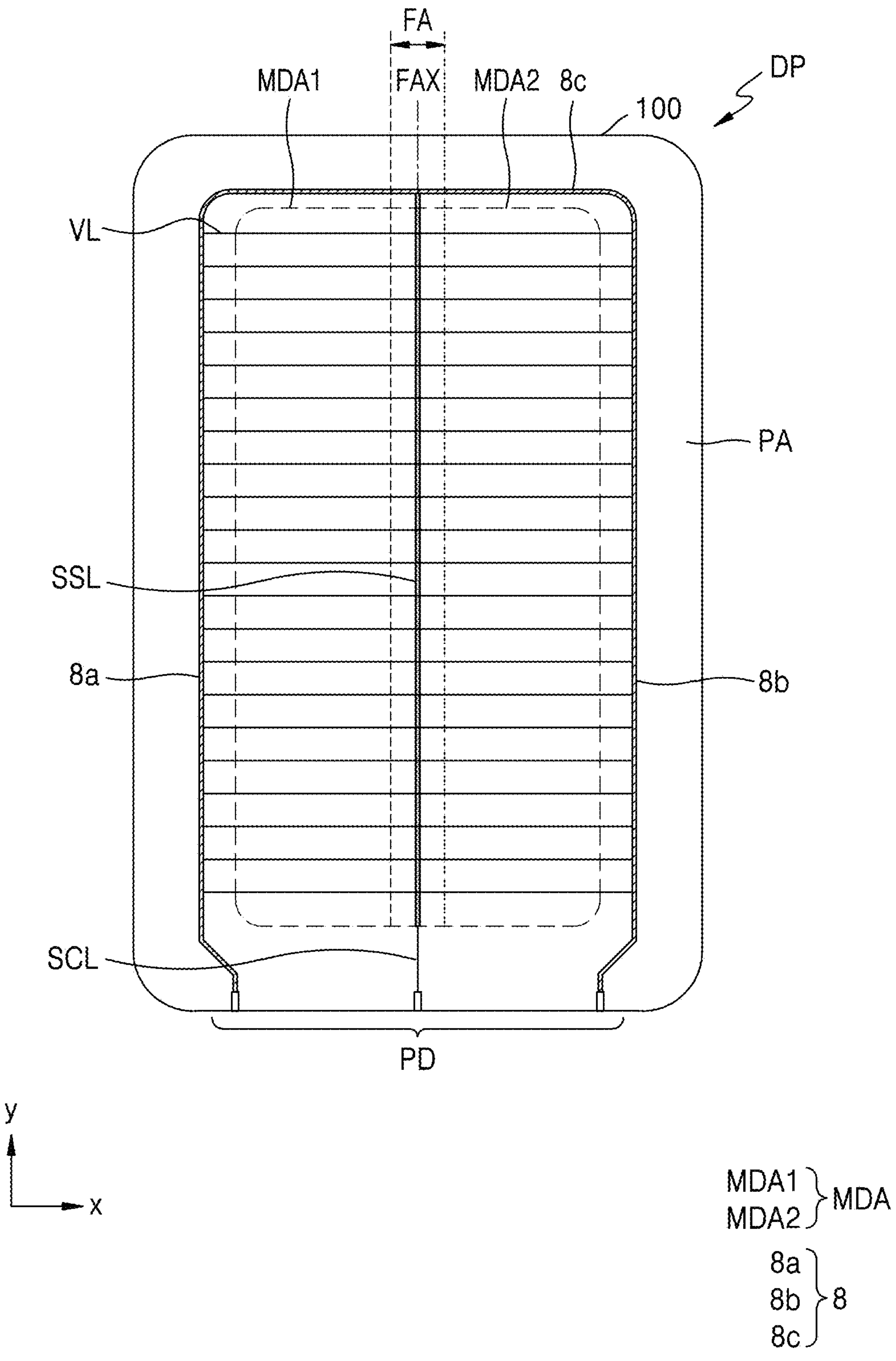
FIG. 8 is a plan view schematically illustrating a portion of a display apparatus according to some embodiments.

FIG. 8 is a plan view schematically illustrating a portion of a display apparatus according to some embodiments.

Referring to FIG. 8, the display apparatus may include a display panel DP. The display panel DP may be folded or unfolded with respect to the folding axis FAX extending in the second direction (y direction) across the main display area MDA. The main display area MDA may be divided into a first main display area MDA1 and a second main display area MDA2 with respect to the folding axis FAX. The first main display area MDA1 may be located on the left (−x direction) with respect to the folding axis FAX, and the second main display area MDA2 may be located on the right (+x direction) with respect to the folding axis FAX. The first main display area MDA1 and the second main display area MDA2 may be folded to face each other with respect to the folding axis FAX. Alternatively, the first main display area MDA1 and the second main display area MDA2 may each be folded to face outward with respect to the folding axis FAX.

The main display area MDA may include a folding area FA adjacent to the folding axis FAX. The folding area FA is an area that increases or decreases when the display apparatus is folded or unfolded, and may include a portion of the first main display area MDA1 and a portion of the second main display area MDA2. The folding area FA may extend in the second direction (y direction).

The first voltage line 8 may include a 1st-1 voltage line 8*a*, a 1st-2 voltage line 8*b* located on both sides of the peripheral area PA with the main display area MDA therebetween, and a 1st-3 voltage line 8*c* connecting the 1st-1 voltage line 8*a* to the 1st-2 voltage line 8*b*. The 1st-1 voltage line 8*a* may extend from the left side of the peripheral area PA (−x direction) in the second direction (y direction), and the 1st-2 voltage line 8*b* may extend from the right side of the peripheral area PA (+x direction) in the second direction (y direction), and the 1st-3 voltage line 8*c* may extend from the upper side of the peripheral area PA (+y direction) in the first direction (x-direction). That is, the first voltage line 8 may have a loop shape with one side open extending along the border of the main display area MDA.

A plurality of second voltage lines VL may be located in the main display area MDA and electrically connect the first voltage line 8 to the pixels (P, see FIG. 3). For example, each of the second voltage lines VL may extend from the 1st-1 voltage line 8*a* through the main display area MDA to the 1st-2 voltage line 8*b*. The second voltage lines VL may be electrically connected to the pixels P arranged in the same row and may be voltage lines configured to transmit a DC voltage to each pixel circuit (PC, see FIG. 4C).

The sensing wire SSL may be arranged in the folding area FA. The sensing wire SSL may be located adjacent to the folding axis FAX and may extend approximately in the second direction (y-direction) parallel to the folding axis FAX. The sensing wire SSL may be arranged adjacent to the folding axis FAX. According to some embodiments, the sensing wire SSL may be arranged to overlap the folding axis FAX on a plane. The electrical characteristics of the sensing wire SSL, such as resistance, may change when the display panel DP is folded or unfolded.

The sensing wire SSL may include a first end and a second end. The first end of the sensing wire SSL may be electrically connected to the first voltage line 8, and the second end thereof may be electrically connected to the connection wire SCL. According to some embodiments, the first end of the sensing wire SSL may be electrically connected to the 1st-3 voltage line 8*c* on the upper side of the peripheral area PA (+y direction) with respect to the main display area MDA. The second end of the sensing wire SSL may be electrically connected to the connection wire SCL located below the peripheral area PA (−x direction). According to some embodiments, the first end of the sensing wire SSL may be electrically connected to one of the second voltage lines VL in the main display area MDA. That is, the sensing wire SSL may be configured to receive a sensing driving voltage through the first voltage line 8 or the second voltage line VL electrically connected to the first voltage line 8.

FIG. 8 illustrates the sensing wire SSL electrically connected to the first voltage line 8, but the disclosure is not limited thereto. The first end of the sensing wire SSL may be electrically connected to the first power voltage line (6, see FIG. 3) or the second power voltage line (7, see FIG. 3).

Figure 9A:
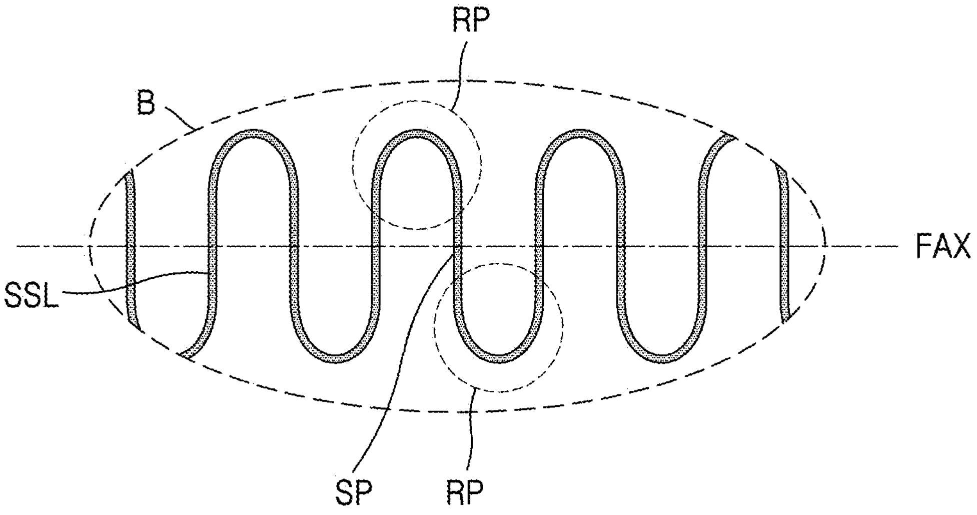
FIGS. 9A, 9B, and 9C are each a plan view schematically illustrating a portion of a sensing line according to some embodiments.
Figure 9B:
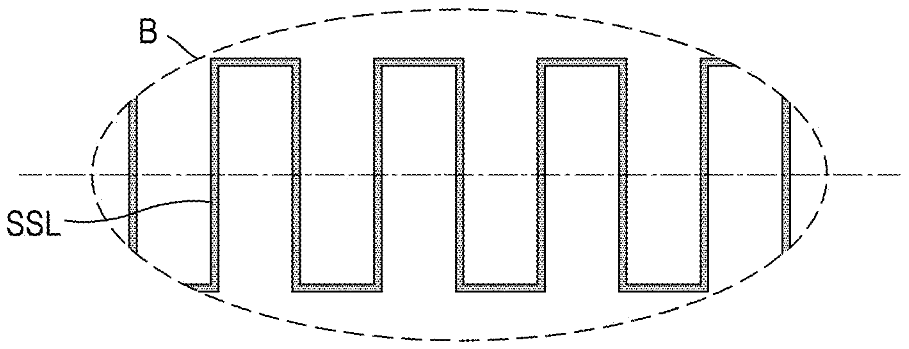
Figure 9C:
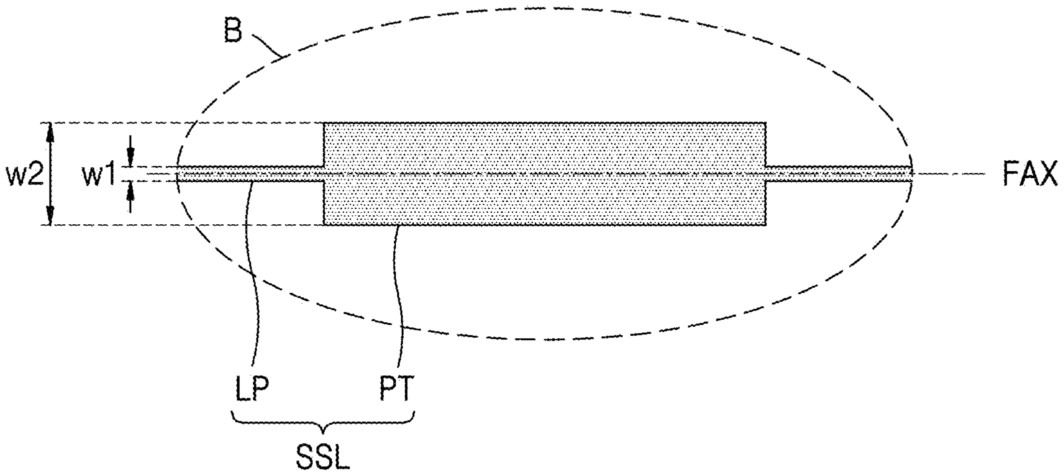

FIGS. 9A, 9B, and 9C are each a plan view schematically illustrating a portion of a sensing line according to some embodiments. FIGS. 9A, 9B, and 9C each illustrate an enlarged view of area B in FIG. 6.

Referring to FIG. 9A, the sensing wire SSL may have a winding shape on a plane. The sensing wire SSL may have an approximately "S" shape. For example, the sensing wire SSL may include two round portions RP and a connection portion SP connecting the two round portions RP. Each of the two round portions RP may have an approximately arc shape. The connection portion SP may be an approximately straight type. In FIG. 9A, the connection portion SP extends in a direction perpendicular to a direction in which the folding axis FAX extends, but the disclosure is not limited thereto. The connection portion SP may extend in a direction oblique to the direction in which the folding axis FAX extends.

Referring to FIG. 9B, the sensing wire SSL may include horizontal wires extending in a direction parallel to the extension direction of the folding axis FAX and vertical wires extending in a direction perpendicular to the extension direction of the folding axis FAX. As the horizontal wires and the vertical wires are arranged alternately, the sensing wire SSL may have an approximately square wave shape on a plane. According to some embodiments, the sensing wire SSL may have various shapes, such as a sine wave shape or a triangular wave shape, on a plane.

Referring to FIG. 9C, the sensing wire SSL may include wiring portions LP extending along the folding axis FAX and a pattern portion PT arranged between the wiring portions LP. According to some embodiments, the pattern portion PT may have a substantially rectangular shape on a plane. The wiring portion LP may have a first width w1 in the direction perpendicular to the extension direction of the folding axis FAX, and the pattern portion PT may have a second width w2 that is larger than the first width w1 in the direction perpendicular to the extension direction of the folding axis FAX. On a plane, the pattern portion PT may have other polygonal, circular, oval, or irregular shape.

According to some embodiments, the pattern portion PT may have a winding shape on a plane. For example, the sensing wire SSL may include a winding pattern portion PT between the straight wiring portions LP. Accordingly, the sensing wire SSL may have a partially winding shape.

Figure 10A:
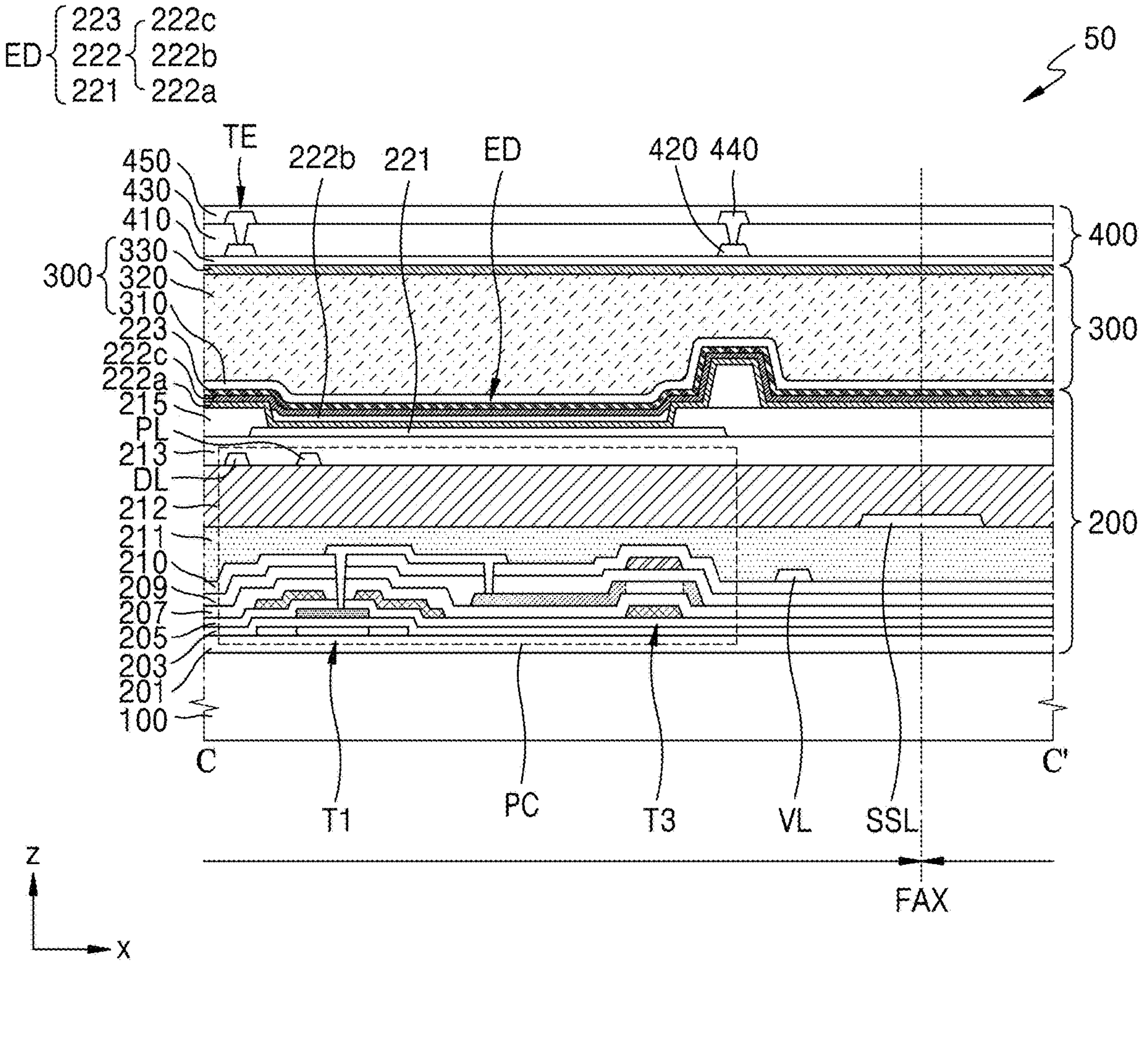
FIGS. 10A, 10B, and 10C are each a cross-sectional view schematically illustrating a portion of a display apparatus according to some embodiments.
Figure 10B:
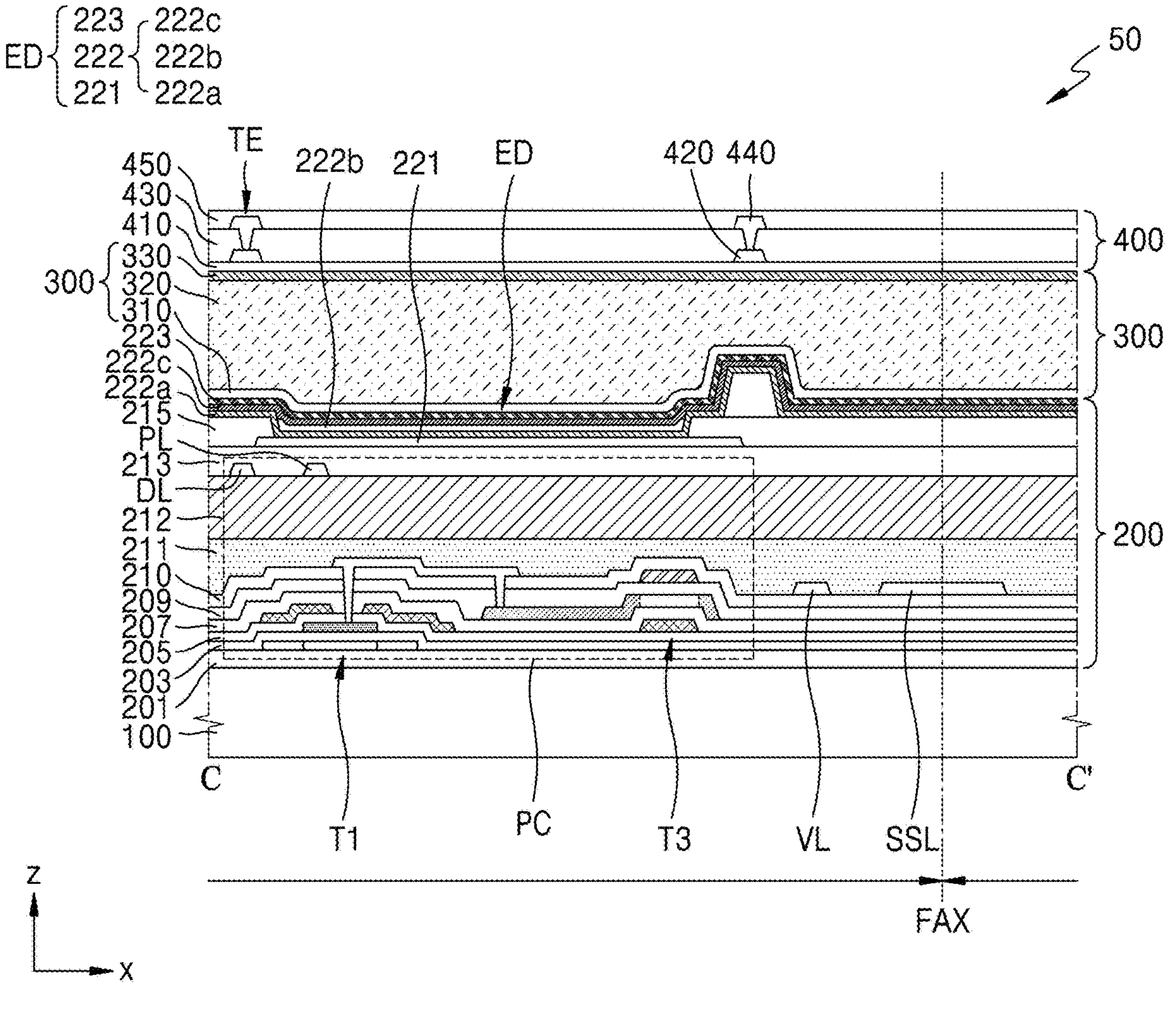
Figure 10C:
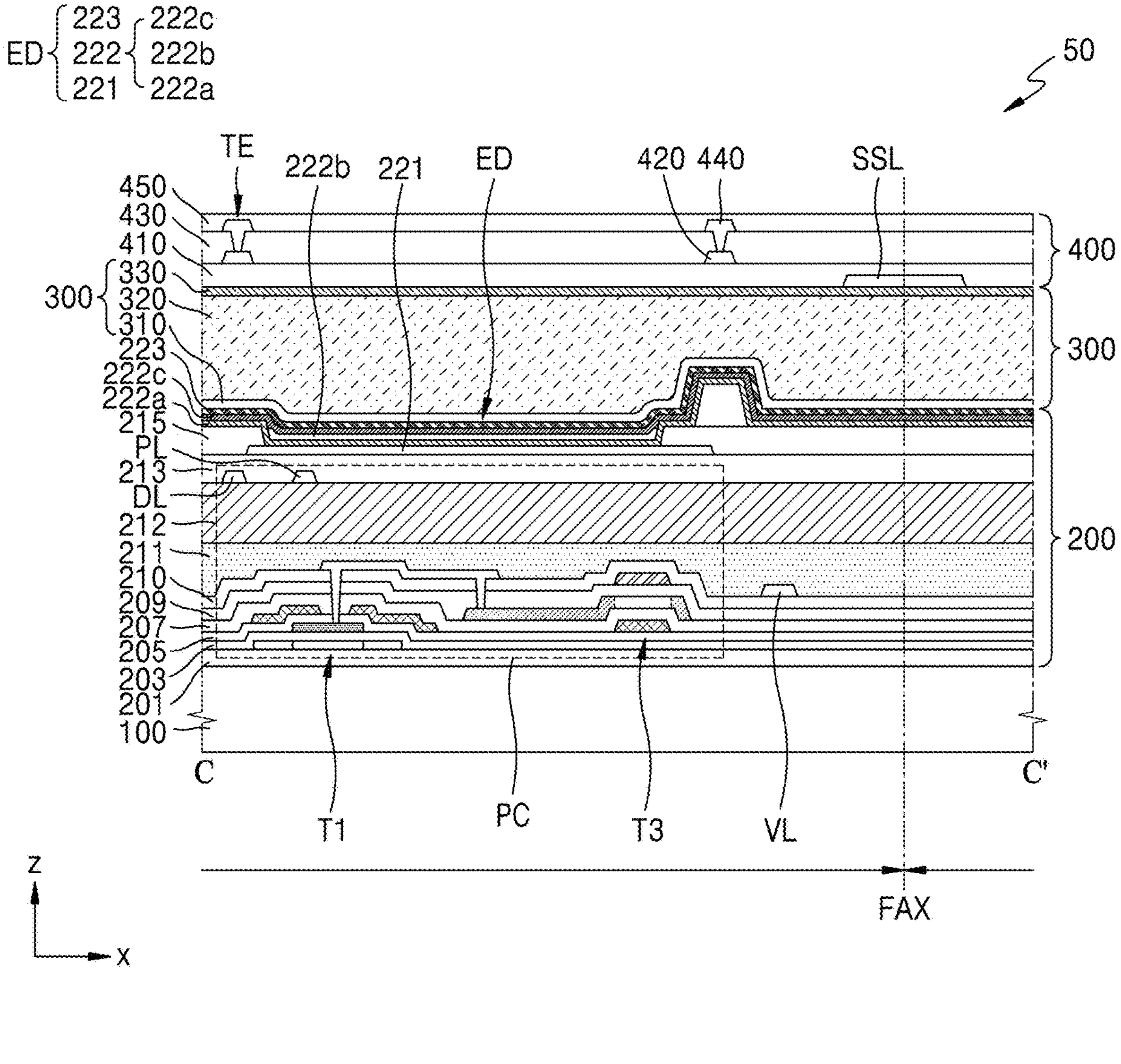

FIGS. 10A, 10B, and 10C are each a cross-sectional view schematically illustrating a portion of a display apparatus according to some embodiments.

Referring to FIGS. 10A, 10B, and 10C, a display panel of the display apparatus 50 may include a substrate 100, a display layer 200, an encapsulation layer 300, and an input sensing layer 400. The display layer 200 may include a pixel circuit PC located in the display area DA and a display element ED electrically connected to the pixel circuit PC.

The display layer 200 may be located on the substrate 100. The display layer 200 may include a buffer layer 201, and the pixel circuit PC may be located on the buffer layer 201. The pixel circuit PC may include a first transistor T1 and a third transistor T3. The first transistor T1 may include a silicon-based semiconductor thin-film transistor including a silicon-based semiconductor layer, and the third transistor T3 may be an oxide-based semiconductor thin-film transistor including an oxide-based semiconductor layer.

The display element ED electrically connected to the pixel circuit PC may be located on the pixel circuit PC. The display element ED may include an organic light-emitting diode including a pixel electrode 221, an opposite electrode 223, and an intermediate layer 222 arranged between the pixel electrode 221 and the opposite electrode 223.

The display layer 200 may include a plurality of insulating layers, for example, a first gate insulating layer 203, a first interlayer insulating layer 205, a second interlayer insulating layer 207, a second gate insulating layer 209, a third interlayer insulating layer 210, a first organic insulating layer 211, a second organic insulating layer 212, a third organic insulating layer 213, and a bank layer 215. Conductive layers may be arranged between the plurality of insulating layers. A first conductive layer including a gate electrode of the first transistor T1 may be arranged between the first gate insulating layer 203 and the first interlayer insulating layer 205, a second conductive layer including a lower gate electrode (G3A, see FIG. 5) of the third transistor T3 may be arranged between the first interlayer insulating layer 205 and the second interlayer insulating layer 207, and a third conductive layer including an upper gate electrode (G3B, see FIG. 5) of the third transistor T3 may be arranged between the second gate insulating layer 209 and the third interlayer insulating layer 210. A fourth conductive layer, a fifth conductive layer, and a sixth conductive layer each including connection electrodes and wires may be respectively arranged between the third interlayer insulating layer 210 and the first organic insulating layer 211, between the first organic insulating layer 211 and the second organic insulating layer 212, and between the second organic insulating layer 212 and the third organic insulating layer 213. A seventh conductive layer including the pixel electrode 221 may be arranged between the third organic insulating layer 213 and the bank layer 215.

The second voltage line VL may be included in any one of the conductive layers included in the display layer 200. In this regard, FIGS. 10A to 10C illustrate the second voltage line VL included in the fourth conductive layer arranged between the third interlayer insulating layer 210 and the first organic insulating layer 211, but the disclosure is not limited thereto. A position of the second voltage line VL may be changed in various manners depending on the design of the pixel circuit PC.

The sensing wire SSL may be arranged adjacent to the folding axis FAX. The sensing wire SSL may be arranged adjacent to the folding axis FAX. The sensing wire SSL may be arranged to overlap the folding axis FAX on a plane. According to some embodiments, the sensing wire SSL may be arranged in the display layer 200, but may be arranged on a different layer from that of the second voltage line VL. In this regard, FIG. 10A shows that the second voltage line VL is arranged between the third interlayer insulating layer 210 and the first organic insulating layer 211, and the sensing wire SSL is arranged between the first organic insulating layer 211. and the second organic insulating layer 212, but the disclosure is not limited thereto.

According to some embodiments, the sensing wire SSL may be arranged on the same layer as the second voltage line VL. For example, as illustrated in FIG. 10B, the sensing wire SSL and the second voltage line VL may be arranged between the third interlayer insulating layer 210 and the first organic insulating layer 211. As described above, the sensing wire SSL may be arranged in the display layer 200, and the design may be changed in various manners as needed.

According to some embodiments, the sensing wire SSL may be arranged between the encapsulation layer 300 and the input sensing layer 400. For example, as illustrated in FIG. 10C, the sensing wire SSL may be arranged between the second inorganic encapsulation layer 330 and the first touch insulating layer 410. According to some embodiments, the sensing wire SSL may be arranged between the first touch insulating layer 410 and the second touch insulating layer 430 or between the second touch insulating layer 340 and the third touch insulating layer 450.

Figure 11:
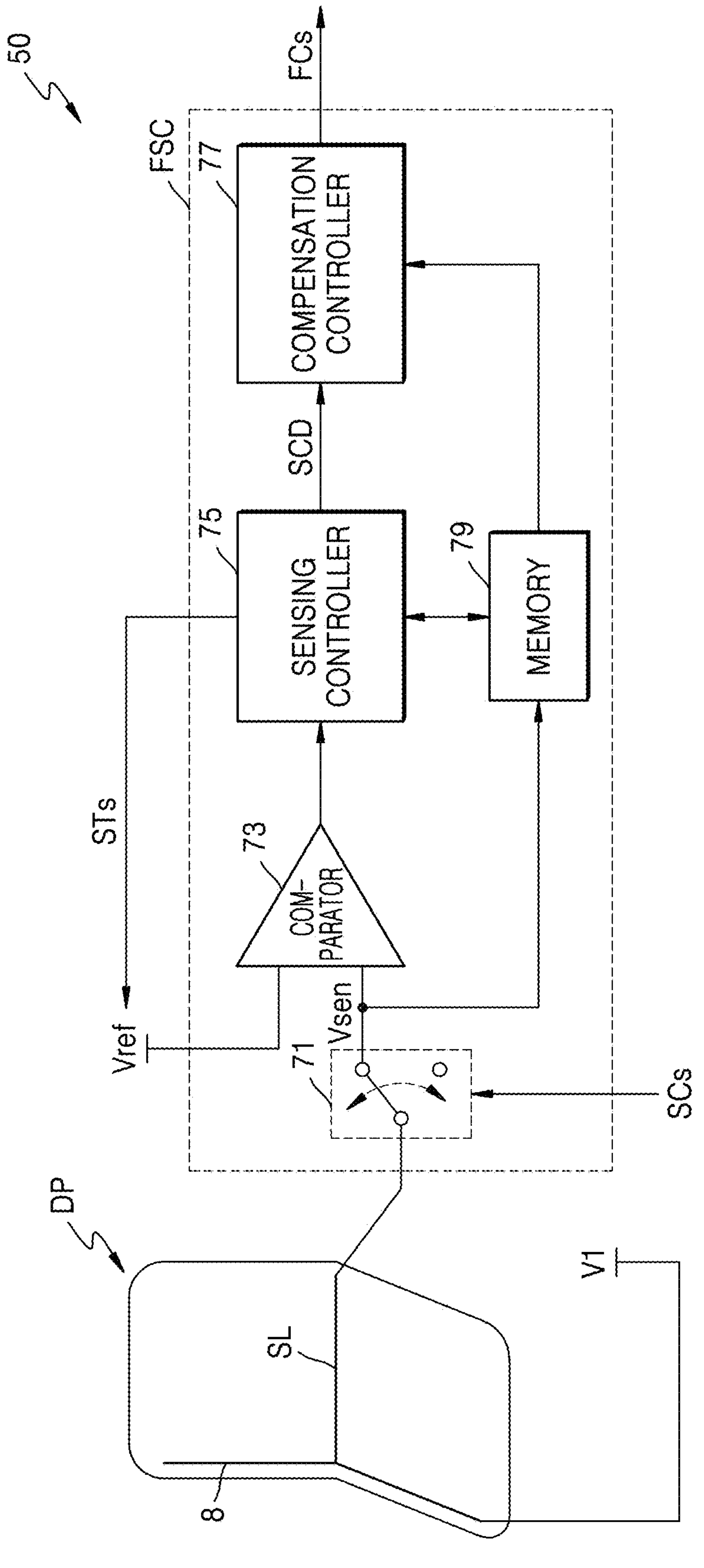
FIG. 11 is a diagram schematically illustrating a sensing circuit included in a display apparatus, according to some embodiments.

FIG. 11 is a diagram schematically illustrating a sensing circuit included in a display apparatus, according to some embodiments.

Referring to FIG. 11, the display apparatus 50 may include the display panel DP and the sensing circuit FSC. The first voltage line 8 and the sensing wire SSL may be located on the display panel DP. The first voltage line 8 may include an outer voltage line configured to transmit a first voltage V1 to the pixels P (see FIG. 3). The first voltage V1 may include a sensing driving voltage and may include a DC voltage supplied to a pixel circuit. For example, the first voltage V1 may include a first initialization voltage (Vint, see FIG. 4B), a second initialization voltage (Vaint, see FIG. 4*b*), a sustaining voltage (VSUS, see FIG. 4C), etc.

The sensing wire SSL may be electrically connected to the first voltage line 8 and the sensing circuit FSC. The first end of the sensing wire SSL may be electrically connected to the first voltage line 8, and the second end thereof may be electrically connected to the sensing circuit FSC through the connection wire (SCL, see FIG. 6). According to some embodiments, the first end of the sensing wire SSL may be electrically connected to the first power voltage line (6, see FIG. 6) or the second power voltage line (7, see FIG. 6), and the second end of the sensing wire SSL may be connected to the sensing circuit FSC through the connection line SCL.

The sensing circuit FSC may include a switch 71, a comparator 73, a sensing controller 75 (first controller), a compensation controller 77 (second controller), and a memory 79.

The switch 71 may selectively electrically connect the sensing wire SSL to the comparator 73 according to switch control signals SCs. During a period during which the switch control signal SCs is supplied with an on voltage (hereinafter, an on voltage period), the switch 71 may electrically connect the sensing wire SSL to the comparator 73, and during a period in which an off voltage is supplied with an off voltage (hereinafter referred to as an off voltage period), the switch 71 may electrically disconnect the sensing wire SSL from the comparator 73. The sensing wire SSL, which is electrically disconnected from the comparator 73, may be maintained in a floating state. According to some embodiments, the switch 71 may electrically connect the sensing wire SSL to the comparator 73 during a vertical blank time, which is an on-voltage period of the vertical synchronization signal (Vsync, see FIG. 2). The sensing circuit FSC may be configured to measure a measured voltage Vsen of the sensing wire SSL only during the vertical blank time, thereby minimizing or reducing noise caused by driving pixels and detecting the folding state accurately.

The comparator 73 may include a first input terminal, a second input terminal, and an output terminal. The first input terminal of the comparator 73 may be configured to receive a reference voltage Vref from the voltage generator (15, see FIG. 2), and the second input terminal of the comparator 73 may be configured to receive the measured voltage Vsen when the switch 71 electrically connects the sensing wire SSL to the comparator 73. The comparator 73 may compare the reference voltage Vref and the measured voltage Vsen and output an output value corresponding to a greater voltage among the two voltages, through the output terminal. For example, the comparator 73 may output a first value to the sensing controller 75 when the measured voltage Vsen is less than or equal to the reference voltage Vref, and output a second value to the sensing controller 75 when the measured voltage Vsen is greater than the reference voltage Vref.

The reference voltage Vref may be the measured voltage Vsen of the sensing wire SSL at a point when the display panel DP is folded or unfolded and images to be displayed to a user need to be rearranged or the color coordinates or luminance of the pixels are or is to be compensated for, and a value of the reference voltage Vref may be measured in advance during the manufacturing process and stored in the memory 79.

The sensing controller 75 may be configured to detect the folding state of the display panel DP based on an output value of the comparator 73 and generate sensing data SCD including the folding state. For example, when the output value of the comparator 73 is the first value, the sensing controller 75 may determine that the folding state of the display panel DP is a folded state and generate sensing data SCD including this state. When the output value of the comparator 73 is the second value, the sensing controller 75 may determine that the folding state of the display panel DP is an unfolded state and generate sensing data SCD including this state. The sensing controller 75 may determine that the folding state of the display panel DP has changed when the output value of the comparator 73 is changed, for example, from the first value to the second value or from the second value to the first value.

The memory 79 may store look-up tables for compensating for the color coordinates or luminance of pixels according to the reference voltage Vref and the folding state of the display panel DP. The memory 79 may store a value of the measured voltage Vsen for a certain period of time.

According to some embodiments, the folding state may be divided into several stages depending on an angle at which the display panel DP is folded. In this case, a plurality of reference voltages Vref corresponding to respective stages of the folding state may be stored in the memory 79. The sensing controller 75 may change a stage of the folding state when the comparator 73 outputs the first value, and the voltage generator 15 may output a voltage control signal Ts configured to output a reference voltage Vref corresponding to the stage. The voltage generator 15 may change the reference voltage Vref according to a voltage control signal STs. According to some embodiments, the sensing controller 75 may detect the operating state of the display panel DP, whether the display panel DP is unfolded or folded, based on a change in the value of the measured voltage Vsen. In addition, the sensing controller 75 may detect a folding speed at which the display panel DP is unfolded or folded, based on a change in the value of the measured voltage Vsen during a certain time period. The sensing data SCD may include an operating state and/or folding speed of the display panel DP.

The compensation controller 77 may be configured to generate display control signals FCs based on the sensing data SCD and a lookup table stored in the memory 79.

The display control signal FCs may include an image control signal configured to rearrange images displayed by the pixels according to the folding state of the display panel DP. For example, when the display panel DP is fully unfolded, the image may be rearranged such that one single image is displayed expanded over the first main display area (MDA1, see FIG. 1C) and the second main display area (MDA2, see FIG. 1C). With the display panel DP out-folded, images may be rearranged such that the first main display area MDA1 and the second main display area MDA2 display different screens. When the display panel DP is completely in-folded, the main display area MDA may not display images, and images may be displayed in the sub-display area SDA (see FIG. 1B).

The display control signal FCs may include an image quality control signal configured to compensate for the color coordinates and/or luminance of pixels according to the folding state of the display panel DP. For example, when the display panel DP is out-folded, the folding area FA (see FIG. 6) increases and the color coordinates and/or luminance of pixels located in the folding area FA may change. The compensation controller 77 may compensate for the color coordinates and/or luminance of the pixels based on the sensing data SCD and the look-up table, and the display apparatus 50 may display a high-quality image, accordingly.

The display apparatus 50 may further include a mechanism for folding or unfolding the display panel DP. In this case, the compensation controller 77 may be configured to generate a mechanism control signal for controlling a mechanism based on the sensing data SCD. For example, even when the user applies a small amount of force to fold or unfold the display apparatus 50, the mechanism may completely fold or unfold the display panel DP according to the mechanism control signal.

The comparator 73 quickly compares two input voltages and outputs a comparison result, so the sensing circuit FSC may quickly determine the folding state of the display panel DP by using the output value of the comparator 73, and images may be rearranged or the color coordinates and/or luminance of the pixels may be compensated.

Figure 12:
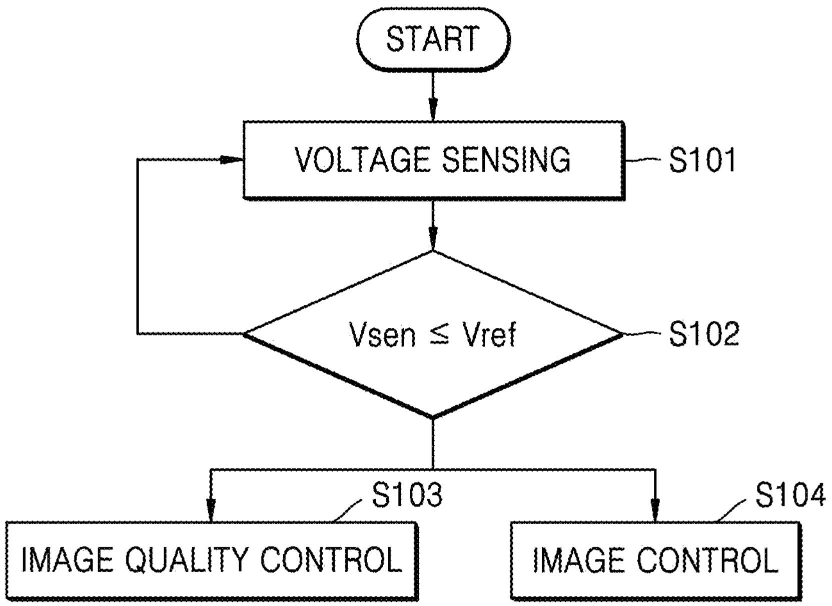
FIG. 12 is a flow diagram schematically illustrating a method of driving a display apparatus, according to some embodiments.

FIG. 12 is a flow diagram illustrating aspects of a method of driving a display apparatus, according to some embodiments. Although FIG. 12 illustrates various operations in a method of driving a display apparatus, embodiments according to the present disclosure are not limited thereto, and according to various embodiments, the method may include additional operations without departing from the spirit and scope of embodiments according to the present disclosure.

Figure 13:
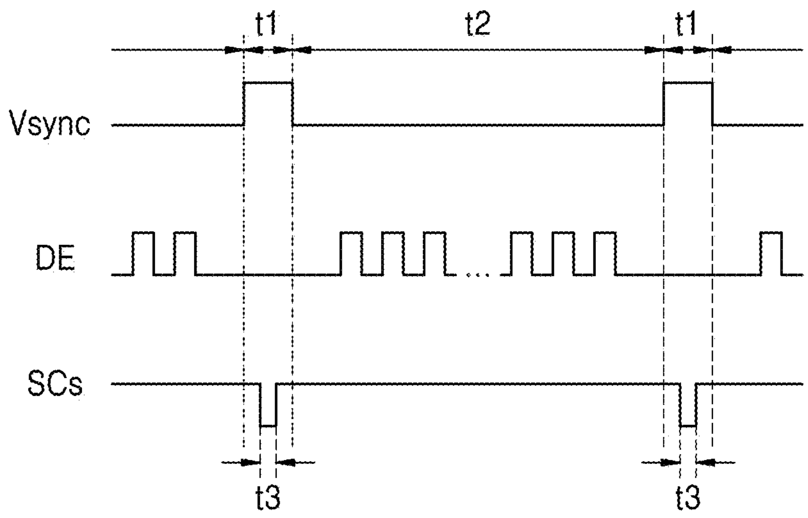
FIG. 13 is a timing diagram for describing an operation timing of a vertical synchronization signal and a sensing control signal according to some embodiments.

FIG. 13 is a timing diagram for describing an operation timing of a vertical synchronization signal and a sensing control signal according to some embodiments.

Referring to FIGS. 11 and 12 together, the method of driving a display apparatus may include a voltage sensing operation (S101), a voltage comparison operation (S102), an image quality control operation (S103), and an image control operation (S104).

In voltage sensing operation S101, the switch 71 may selectively electrically connect the sensing wire SSL to the comparator 73 according to the switch control signal SCs. During an on-voltage period of the switch control signal SCs, the switch 71 may electrically connect the sensing wire SSL to the comparator 73, and during an off-voltage period of the switch control signal SCs, the switch 71 may electrically disconnect the sensing wire SSL from the comparator 73. The sensing wire SSL, which is electrically disconnected from the comparator 73, may be maintained in a floating state.

Referring to FIG. 13, the on-voltage period of the switch control signal SCs may overlap with an on-voltage period of the vertical synchronization signal Vsync. As described above, the vertical synchronization signal Vsync is a reference signal that indicates a start or end of one frame. A data enable signal DE is a signal that indicates a section including actual valid image data within one line time.

A first period t1 is an on-voltage period of the vertical synchronization signal Vsync, and may be expressed as a vertical blank time, which is a period in which there is no on-voltage pulse of the data enable signal DE. A second period t2 is an off-voltage period of the vertical synchronization signal Vsync, and may be expressed as a display active time, which is a period in which an on-voltage pulse of the data enable signal DE is output at intervals (e.g., set or predetermined intervals).

A third period t3 is an on-voltage period of the switch control signal SCs and may overlap with the first period t1. That is, the sensing circuit FSC may measure the measured voltage Vsen of the sensing wire SSL during the vertical blank time. During the second period t2, transistors of the pixel circuit (PC, see FIGS. 4A to 4C) may be electrically connected to the second voltage line (VL, see FIG. 6). Accordingly, a voltage of the sensing wire SSL may change during the second period t2. The sensing circuit FSC may be configured to measure a measured voltage Vsen of the sensing wire SSL only during the vertical blank time, thereby minimizing or reducing noise caused by driving pixels and detecting a folding state accurately.

In voltage comparison operation S102, the sensing circuit FSC may compare the measured voltage Vsen with the reference voltage Vref, and when the measured voltage Vsen is less than or greater than the reference voltage Vref, the sensing circuit FSC may determine that the folding state of the display panel DP is a folded state, and when the measured voltage Vsen is greater than the reference voltage Vref, the sensing circuit FSC may determine that the folding state of the display panel DP is in an unfolded state. The sensing circuit FSC may detect a folding speed, operating status, etc. based on changes in the value of the measured voltage Vsen. When the folding state of the display panel DP has changed, the sensing circuit FSC may perform image quality control operation S103 and/or image control operation S104, and when the folding state of the display panel DP does not change and is maintained, the sensing circuit FSC may repeatedly perform voltage sensing operation S101.

In image quality control operation S103, the sensing circuit FSC may generate an image quality control signal configured to compensate for the color coordinates and/or luminance of the pixels based on the folding state and a lookup table stored in a memory, and the display driving circuit (DDV, FIG. 2).

In image control operation S104, the sensing circuit FSC may generate an image control signal configured to rearrange images displayed by the pixels, based on the folding state and transmit the signal to the display driving circuit DDV. Depending on the folding state, image quality control operation S103 and image control operation S104 may be performed simultaneously or sequentially. Depending on the folding state, either image quality control operation S103 or image control operation S104 may be omitted.

Figure 14:
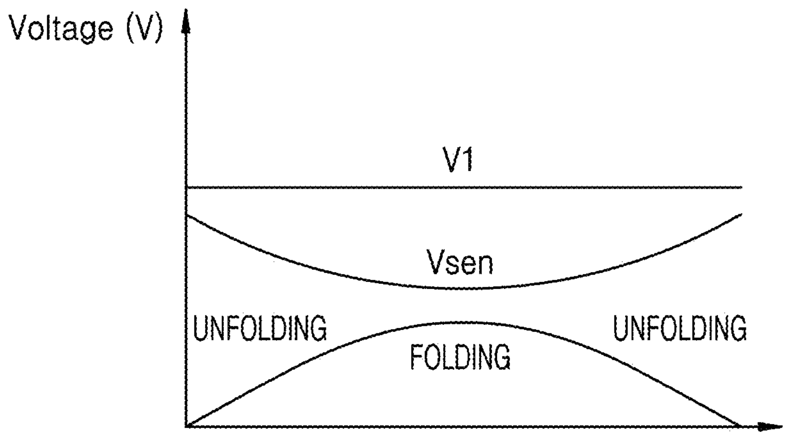
FIG. 14 is a diagram for describing a folding state of a display apparatus and a measured voltage of a sensing line, according to some embodiments.

FIG. 14 is a diagram for schematically describing a folding state of a display apparatus and a measured voltage of a sensing line, according to some embodiments.

Referring to FIGS. 11 and 14 together, the first voltage V1 may be supplied to the first voltage line 8 electrically connected to the sensing wire SSL. The first voltage V1 may include a sensing driving voltage and may be a voltage supplied to the pixel circuit (PC, see FIGS. 4B and 4C). For example, the first voltage V1 may include a first initialization voltage (Vint, see FIG. 4B), a second initialization voltage (Vaint, see FIG. 4B), a sustaining voltage (VSUS, see FIG. 4C), etc. The first voltage V1 may have a constant value while the measured voltage Vsen of the sensing wire SSL is measured.

When the display panel DP is fully unfolded, the measured voltage Vsen may have a slightly lower voltage value than the first voltage V1. As the display panel DP is folded, the measured voltage Vsen of the sensing wire SSL decreases, and when the display panel DP is completely folded, the measured voltage Vsen of the sensing wire SSL has a lowest value. As the display panel DP is unfolded from a folded state, the measured voltage Vsen of the sensing wire SSL may increase again.

The reference voltage Vref may be the measured voltage Vsen of the sensing wire SSL at a point when the display panel DP is folded or unfolded and images to be displayed to a user need to be rearranged or the color coordinates or luminance of the pixels are/is to be compensated for, and a value of the reference voltage Vref may be measured in advance during the manufacturing process and stored in the memory. The reference voltage Vref may be equal to or greater than the lowest value of the measured voltage Vsen and may be less than a highest value of the measured voltage Vsen.

According to some embodiments, the folding state may be divided into several stages depending on an angle at which the display panel DP is folded. In this case, value of the reference voltage Vref may be stored in the memory for each stage of the folding state, and the sensing circuit FSC may change the reference voltage Vref compared with the measured voltage Vsen for each stage. The sensing circuit FSC may detect the folding state of the display panel DP by comparing the measured voltage Vsen of the sensing wire SSL with the reference voltage Vref for each stage.

Figure 15A:
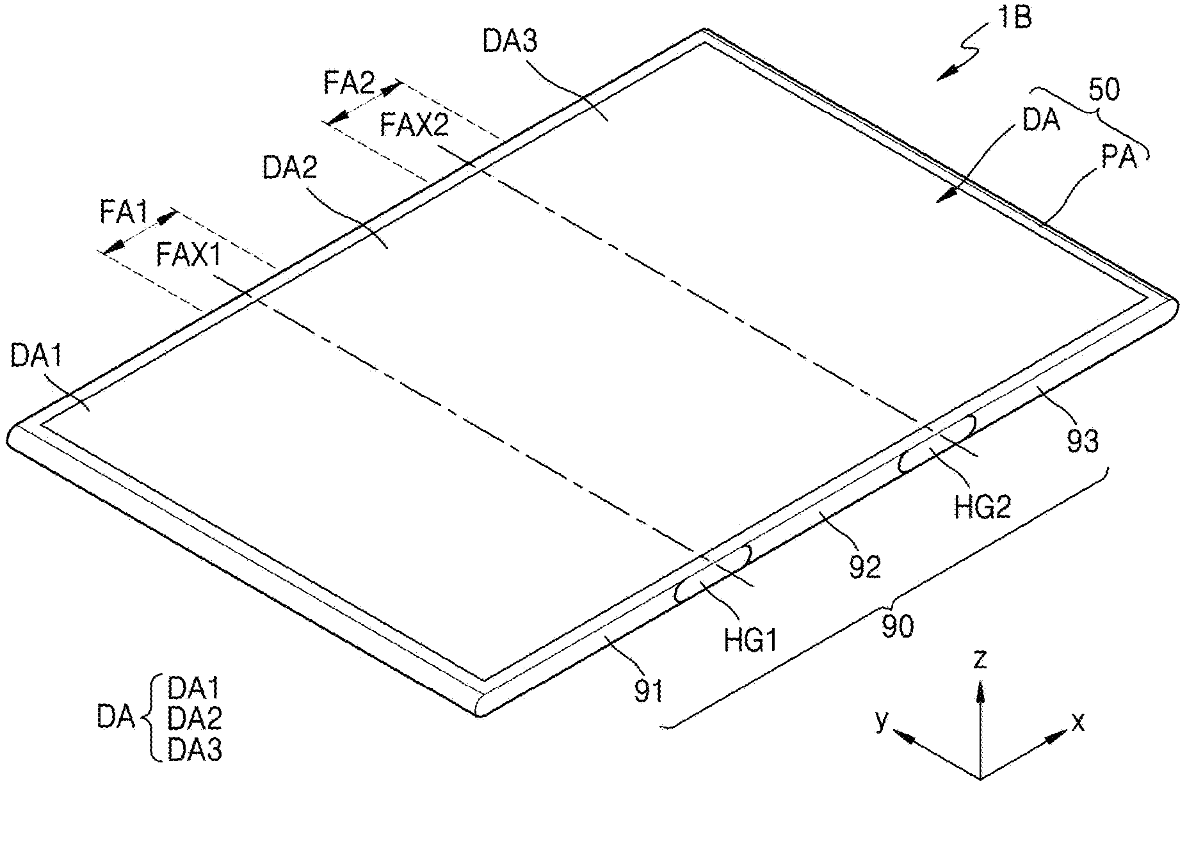
FIGS. 15A and 15B are each a perspective view schematically illustrating an electronic device according to some embodiments.
Figure 15B:
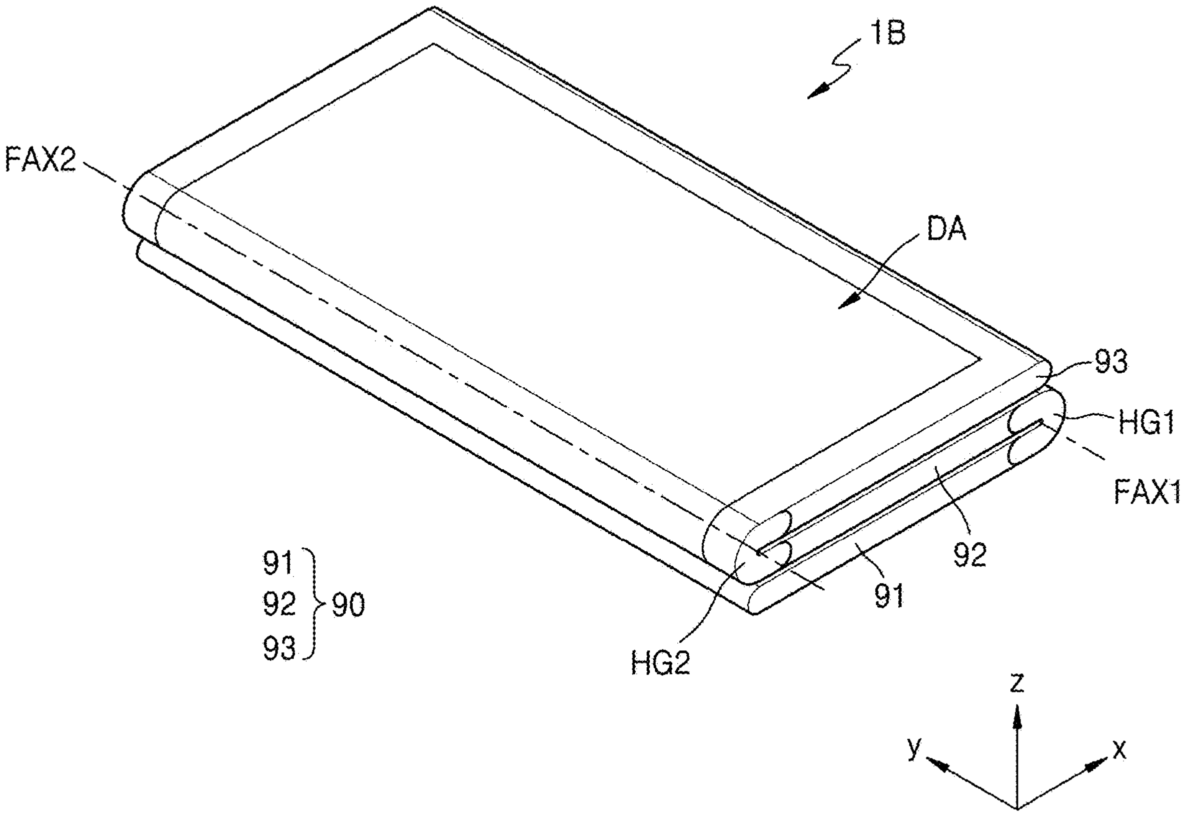
Figure 16:
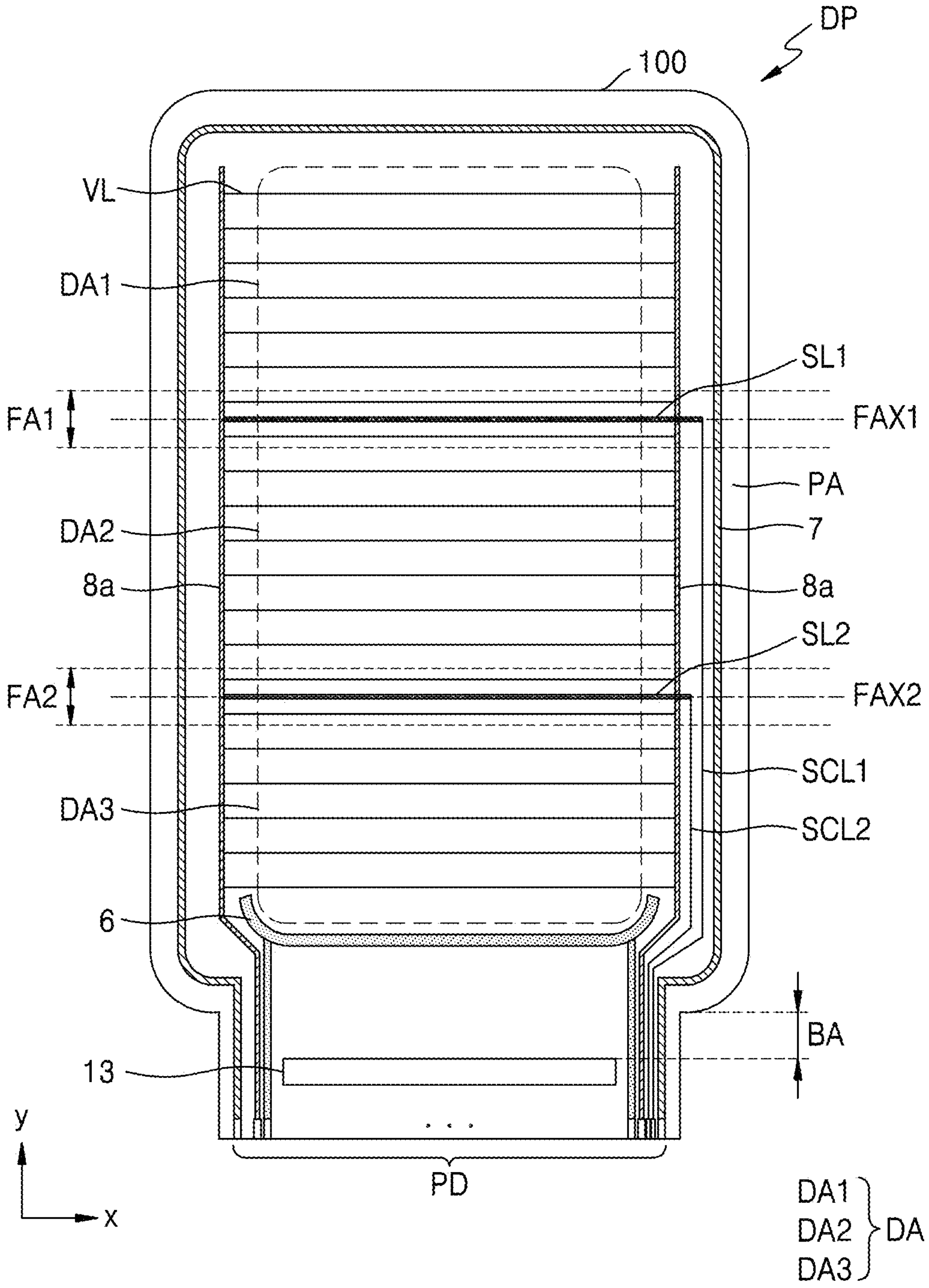
FIG. 16 is a plan view schematically illustrating a display apparatus according to some embodiments.

FIGS. 15A and 15B are each a perspective view schematically illustrating an electronic device according to some embodiments, and FIG. 16 is a plan view schematically illustrating a display apparatus according to some embodiments.

Referring to FIGS. 15A and 15B, an electronic device 1B according to some embodiments may include a display apparatus 50 and a housing 90. The display apparatus 50 may include a display area DA where images are displayed and a peripheral area PA arranged around (e.g., in a periphery or outside a footprint of) the display area DA. Pixels having display elements may be arranged in the display area DA. The display apparatus 50 may display images using light emitted from the pixels arranged in the display area DA. The peripheral area PA may be a type of non-display area in which pixels P are not arranged.

The housing 90 may form the exterior of the electronic device 1B. The housing 90 may include a first portion 91, a second portion 92, and a third portion 93 that support the display apparatus 50. The housing 90 may have a first hinge HG1 between the first portion 91 and the second portion 92 and a second hinge HG2 between the second portion 92 and the third portion 93. The electronic device 1B may be folded or unfolded near the first hinge HG1 and the second hinge HG2.

For example, the display area DA may include a first display area DA1 located in the first portion 91 of the housing 90, a second display area DA2 located in the second portion 92 of the housing 90, and a third display area DA3 located in the third portion 93 of the housing 90. A first folding axis FAX1 overlapping the first hinge HG1 may be located between the first display area DA1 and the second display area DA2, and a second folding axis FAX2 overlapping the second hinge HG2 may be located between the second display area DA2 and the third display area DA3. The display apparatus 50 may be folded or unfolded with respect to the first folding axis FAX1 and the second folding axis FAX2.

As illustrated in FIG. 15B, the first display area DA1 and the second display area DA2 may be folded to face each other with respect to the first folding axis FAX1, and the second display area DA2 and the third display area DA3 may be folded to face outward with respect to the second folding axis FAX2. The display area DA may include the first folding area FA1 adjacent to the first folding axis FAX1 and the second folding area FA2 adjacent to the second folding axis FAX2. The first folding area FA1 and the second folding area FA2 may be areas that expand or contract when the electronic device 1B is folded or unfolded, and may be areas where stress due to deformation of the display apparatus 50 is concentrated.

As illustrated in FIG. 15B, when the electronic device 1B is completely folded, a user may only use the third display area DA3 located on the outside. In this case, the electronic device 1B may not display images in the first display area DA1 and the second display area DA2, but may display images only in the third display area DA3. As illustrated in FIG. 15A, when the electronic device 1B is completely unfolded, images may be displayed expanded throughout the first display area DA1, the second display area DA2, and the third display area DA3. The electronic device 1B may automatically control images by detecting changes in the folding state.

Referring to FIG. 6, a display apparatus according to some embodiments may include a display panel DP. The display panel DP may include a display area DA and a peripheral area PA outside the display area DA.

The display panel DP may be folded or unfolded with respect to a first folding axis FAX1 and a second folding axis FAX2 extending in the first direction (x-direction) across the display area DA. The display area DA may be divided into a first display area DA1, a second display area DA2, and a third display area DA3 by the first folding axis FAX1 and the second folding axis FAX2. The first display area DA1 and the second display area DA2 may be folded to face each other with respect to the first folding axis FAX1, and the second display area DA2 and the third display area DA3 may be folded to face outward with respect to the second folding axis FAX2.

The display area DA may include the first folding area FA1 adjacent to the first folding axis FAX1 and the second folding area FA2 adjacent to the second folding axis FAX2. The first folding area FA1 may be an area that increases or decreases when the display apparatus is folded or unfolded with respect to the first folding axis FAX1, and may be a portion of the first display area DA1 and a portion of the second display area DA2. The second folding area FA2 is an area that increases or decreases when the display apparatus is folded or unfolded with respect to the second folding axis FAX2, and may be a portion of the second display area DA2 and a portion of the third display area DA3. The first folding area FA1 and the second folding area FA2 may be areas where stress caused by deformation of the display panel DP is concentrated.

A first sensing wire SSL1 may be arranged in the first folding area FA1, and a second sensing wire SSL2 may be arranged in the second folding area FA2. The first sensing wire SSL1 may be located adjacent to the first folding axis FAX1 and extend in a direction parallel to the first folding axis FAX1. The second sensing wire SSL2 may be located adjacent to the second folding axis FAX2 and extend in a direction parallel to the second folding axis FAX2. Each of the first sensing wire SSL1 and the second sensing wire SSL2 may extend overall in the first direction (x-direction), but may partially extend in other directions and have a winding shape. According to some embodiments, the first sensing wire SSL1 may be arranged adjacent to the first folding axis FAX1 on a plane, and the second sensing wire SSL2 may be arranged adjacent to the second folding axis FAX2 on a plane.

The electrical characteristics of the first sensing wire SSL1, such as resistance, may change when the display panel DP is folded or unfolded with respect to the first folding axis FAX1. The electrical characteristics of the second sensing wire SSL2 may change when the display panel DP is folded or unfolded with respect to the second folding axis FAX2.

According to some embodiments, each of the first sensing wire SSL1 and the second sensing wire SSL2 may be stretchable and include a conductive material having resistance changing according to a stretch length. Each of the first sensing wire SSL1 and the second sensing wire SSL2 may include a material having stretchability, conductivity, and linearity. Each of the first sensing wire SSL1 and the second sensing wire SSL2 may include conductive nanoparticles and an elastomer. According to some embodiments, a gauge factor of each of the first sensing wire SSL1 and the second sensing wire SSL2 may be about 10 GF to about 1,000 GF.

In the peripheral area PA, the first power voltage line 6, the second power voltage line 7, the first voltage line 8, the connection wire SCL, the data driver 13, and the pad PD may be located. The first power voltage line 6 may be arranged to extend below from the peripheral area PA (−y direction) in the first direction (x direction) with respect to the main display area MDA. The second power voltage line 7 may be located in the peripheral area PA to surround a portion of the main display area MDA. For example, the second power voltage line 7 may have a loop shape that is open on one side and extends along a border of the main display area MDA. The connection wire SCL may extend in the second direction (y direction) along the border of the main display area MDA and may be arranged on one side of the peripheral area PA.

The first voltage line 8 may include a 1st-1 voltage line 8*a* and a 1st-2 voltage line 8*b*. The 1st-1 voltage line 8*a* and the 1st-2 voltage line 8*b* may be respectively located on both sides of the peripheral area PA with the main display area MDA in between, and extend in the second direction (y direction). According to some embodiments, one of the 1st-1 voltage line 8*a* and the 1st-2 voltage line 8*b* may be omitted. According to some embodiments, the first voltage line 8 may further include a 1st-3 voltage line connecting the 1st-1 voltage line 8*a* to the 1st-2 voltage line 8*b*.

A plurality of second voltage lines VL may be located in the main display area MDA and electrically connect the first voltage line 8 to the pixels (P, see FIG. 3). The second voltage lines VL may be electrically connected to the pixels P arranged in the same row and may be voltage lines configured to transmit a DC voltage to each pixel circuit (PC, see FIG. 4C).

The first power voltage line 6, the second power voltage line 7, and the first voltage line 8 may be each electrically connected to the voltage generator 15 (see FIG. 2) located on the circuit board PCB through a corresponding pad PD. The first power voltage line 6 may be configured to receive the first power voltage (VDD, see FIG. 2) from the voltage generator 15. The second power voltage line 7 may be configured to receive the second power voltage (VSS, see FIG. 2) from the voltage generator 15. The first voltage line 8 may be configured to receive a DC voltage from the voltage generator 15. Here, the DC voltage may include voltages supplied to the pixel circuit PC, and may be one of the first initialization voltage (Vint, see FIG. 4B), the second initialization voltage (Vaint, see FIG. 4B), and the sustaining voltage (VSUS, see FIG. 4C).

Each of the first sensing wire SSL1 and the second sensing wire SSL2 may include a first end and a second end. The first end of each of the first sensing wire SSL1 and the second sensing wire SSL2 may be electrically connected to the first voltage line 8. The second end of the first sensing wire SSL1 may be electrically connected to a first connection wire SCL1, and the second end of the second sensing wire SSL2 may be electrically connected to a second connection wire SCL2.

According to some embodiments, the first end of each of the first sensing wire SSL1 and the second sensing wire SSL2 may be electrically connected to one of the second voltage lines VL in the display area DA. That is, each of the first sensing wire SSL1 and the second sensing wire SSL2 may be configured to receive a sensing driving voltage through the first voltage line 8 or the second voltage line VL electrically connected to the first voltage line 8.

Each of the first connection wire SCL1 and the second connection wire SCL2 may be electrically connected to the sensing circuit FSC (see FIG. 3) through a corresponding pad PD. The sensing circuit FSC may be configured to measure changes in the electrical characteristics of each of the first sensing wire SSL1 and the second sensing wire SSL2, detect a folding state of the display panel DP, and generate, based on the detected folding state, a display control signal that controls the pixels P.

The sensing circuit FSC may be configured to compare a first measured voltage of the first sensing wire SSL1 with a first reference voltage of the first sensing wire SSL1, and when the first measured voltage is equal to or smaller than the first reference voltage, determine that the display panel DP to be in a folded state with respect to the first folding axis FAX1. Likewise, the sensing circuit FSC may be configured to compare a second measured voltage of the second sensing wire SSL2 with a second reference voltage of the second sensing wire SSL2, and when the second measured voltage is equal to or smaller than the second reference voltage, determine that the display panel DP to be in a folded state with respect to the second folding axis FAX2.

Here, the first reference voltage may be a measured voltage of the first sensing wire SSL1 at a point when images displayed to a user are to be rearranged or the color coordinates or luminance of the pixels are/is to be compensated, when the display panel DP is folded or unfolded with respect to the first folding axis FAX1, and a value of the first reference voltage may be measured in advance during the manufacturing process and stored in a memory of the sensing circuit FSC. The second reference voltage may be a measured voltage of the second sensing wire SSL2 at a point when images displayed to a user are to be rearranged or the color coordinates or luminance of the pixels are/is to be compensated, when the display panel DP is folded or unfolded with respect to the second folding axis FAX2, and a value of the second reference voltage may be measured in advance during the manufacturing process and stored in the memory of the sensing circuit FSC. The sensing circuit FSC may be configured to generate a display control signal that controls pixels according to the folding state of the display panel DP.

FIGS. 15A, 15B, and 16 show a case where the electronic device 1B has two hinges and the display panel DP is folded or unfolded with respect to the first folding axis FAX1 and the second folding axis FAX2, but the disclosure is not limited thereto. The electronic device 1B has a plurality of hinges, and the display panel DP may be folded or unfolded with respect to a plurality of folding axes. In this case, the same number of sensing wires as the number of folding axes of the display panel DP may be provided and arranged adjacent to the folding axes, respectively. The sensing circuit FSC may compare a measured voltage of each sensing wire with the reference voltage of each sensing wire, detect a folding state of the display panel DP, and generate a display control signal according to the folding state.

Figure 17:
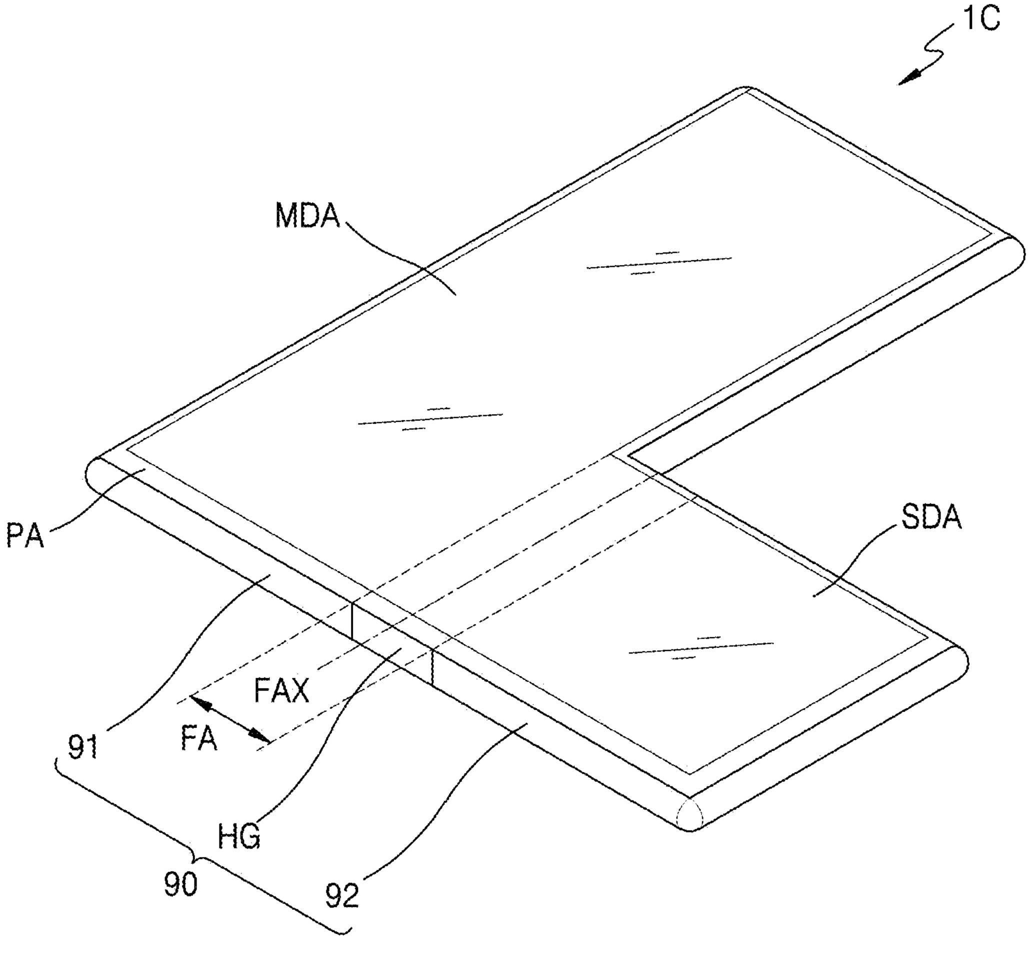
FIGS. 17 and 18 are each a perspective view schematically illustrating an electronic device according to some embodiments.
Figure 18:
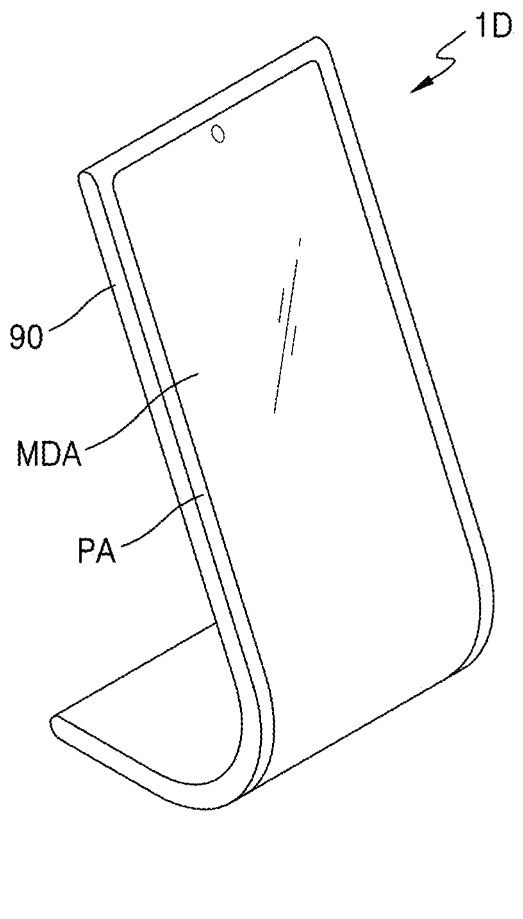

FIGS. 17 and 18 are each a perspective view schematically illustrating an electronic device including a display apparatus according to some embodiments.

Referring to FIG. 17, an electronic device 1C may include a main display area MDA, a sub-display area SDA, and a peripheral area PA. Pixels having display elements may be arranged in the main display area MDA and the sub-display area SDA. An area of the main display area MDA may be different from an area of the sub-display area SDA. For example, the area of the main display area MDA may be larger than the area of the sub-display area SDA. The peripheral area PA may be a non-display area in which pixels are not arranged.

The housing 90 may form the exterior of the electronic device 1C. The housing 90 may include a first portion 91 and a second portion 92 that support the display apparatus 50. An area of the first portion 91 may be different from an area of the second portion 92. The housing 90 may include a hinge HG between the first portion 91 and the second portion 92. The electronic device 1C may be folded or unfolded near the hinge HG.

The main display area MDA may be located in the first portion 91 of the housing 90, and the sub-display area SDA may be located in the second portion 92 of the housing 90. A folding axis FAX that overlaps the hinge HG may be located between the main display area MDA and the sub-display area SDA. The electronic device 1C may be folded or unfolded with respect to the folding axis FAX. When the electronic device 1C is unfolded, the entire display area including the main display area MDA and the sub-display area SDA may have an approximate alphabet "L" shape in a plan view.

The main display area MDA may include a folding area FA adjacent to the folding axis FAX. The display apparatus may include a sensing wire located in the folding area FA. The sensing wire SSL may be arranged adjacent to the folding axis FAX. The sensing wire may be arranged to overlap the folding axis FAX on a plane. A sensing circuit may be configured to measure changes in the electrical characteristics of the sensing wire, detect the folding state of the electronic device 1C, and generate a display control signal that controls pixels based on the detected folding state.

Referring to FIG. 18, an electronic device 1D may include a display area DA and a peripheral area PA. At least a portion of the electronic device 1D may be bent or unfolded. According to some embodiments, the housing 90 may be designed such that, when the electronic device 1D is bent, each portion thereof has the same curvature or different curvature. For example, as illustrated in FIG. 18, the housing 90 may be designed such that some portions of the electronic device 1D are bent more than other portions so that the electronic device 1D stands without falling over. The housing 90 may maintain at least a portion of the electronic device 1D in a bent or unfolded state.

The display apparatus included in the electronic device 1D may include sensing wires located in the display area DA. The sensing wires may be spaced apart from each other at certain intervals in the display area DA. According to some embodiments, the sensing wires may be relatively densely arranged in a portion where the display apparatus is bent with a smaller radius of curvature. The sensing circuit may be configured to measure changes in the electrical characteristics of each sensing wire and detect the bent state of the electronic device 1D, and compensate for the color coordinates and/or luminance of the pixels based on the detected state, or generate a display control signal for rearranging images to be displayed to a user.

According to some embodiments as described above, a display apparatus that detects deformation of the display panel may be implemented. However, the scope of the disclosure is not limited by the above-described effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A display apparatus comprising:

a substrate including a display area and a peripheral area outside the display area, wherein the substrate is foldable about a folding axis extending in a first direction across the display area;

a plurality of pixels in the display area;

a first voltage line in the peripheral area;

a plurality of second voltage lines in the display area and electrically connected to the first voltage line and the plurality of pixels;

a sensing wire adjacent to the folding axis in the display area; and a connection wire in the peripheral area and electrically connected to the sensing wire, wherein the sensing wire comprises a first end and a second end, the first end is electrically connected to the first voltage line, and the second end is electrically connected to the connection wire.

2. The display apparatus of claim 1, wherein the sensing wire has a winding shape.

3. The display apparatus of claim 1, wherein the sensing wire comprises a wiring portion having a first width and a pattern portion having a second width greater than the first width.

4. The display apparatus of claim 1, wherein each of the plurality of pixels comprises a pixel circuit including transistors and a light-emitting diode electrically connected to the pixel circuit, and the light-emitting diode comprises a pixel electrode, an opposite electrode on the pixel electrode, and an emission layer between the pixel electrode and the opposite electrode.

5. The display apparatus of claim 4, wherein the pixel circuit comprises:

a driving transistor electrically connecting a power line to the pixel electrode;

a data write transistor electrically connecting a data line to the driving transistor; and a first initialization transistor electrically connecting one of the plurality of second voltage lines to a gate of the driving transistor.

6. The display apparatus of claim 4, wherein the pixel circuit comprises:

a driving transistor electrically connecting a power line to the pixel electrode;

a data write transistor electrically connecting a data line to the driving transistor; and a second initialization transistor electrically connecting one of the second voltage lines to the pixel electrode.

7. The display apparatus of claim 4, wherein the first voltage line comprises a first power voltage line electrically connected to a power line or a second power voltage line electrically connected to the opposite electrode.

8. The display apparatus of claim 1, wherein the second voltage lines extend in a second direction intersecting the first direction, and the display apparatus further comprises a plurality of third voltage lines extending in the first direction and electrically connected to the plurality of second voltage lines.

9. The display apparatus of claim 1, wherein the sensing wire is stretchable and comprises a material having resistance that changes according to a stretch length.

10. The display apparatus of claim 9, wherein the sensing wire comprises conductive nanoparticles and an elastomer.

11. The display apparatus of claim 1, further comprising:

a display driving circuit configured to drive the plurality of pixels; and a sensing circuit electrically connected to the connection wire and configured to detect a folding state by comparing a measured voltage of the sensing wire with a reference voltage, wherein the display driving circuit comprises:

a data driver configured to supply a data signal to the plurality of pixels;

a gate driver configured to supply scan signals to the plurality of pixels;

a timing controller configured to control an operation timing of the data driver and the gate driver by using a vertical synchronization signal; and a voltage generator configured to supply the reference voltage and a first voltage.

12. The display apparatus of claim 11, wherein the sensing circuit comprises:

a memory storing a lookup table;

a comparator configured to compare the measured voltage with the reference voltage and to output a first value based on the measured voltage being less than or equal to the reference voltage and to output a second value based on the measured voltage being greater than the reference voltage;

a first controller configured to detect the folding state based on an output value of the comparator and to generate sensing data including the folding state; and a second controller configured to generate a display control signal that controls the plurality of pixels based on the lookup table and the sensing data.

13. The display apparatus of claim 12, wherein the first controller is configured to output a voltage control signal that changes the reference voltage based on the output value of the comparator.

14. The display apparatus of claim 12, wherein the sensing circuit further comprises a switch configured to electrically connect the sensing wire to an input terminal of the comparator during an on-voltage period of a switch control signal and electrically disconnect the sensing wire from the input terminal of the comparator during an off-voltage period of the switch control signal.

15. The display apparatus of claim 14, wherein the on-voltage period of the switch control signal overlaps an on-voltage period of the vertical synchronization signal.

16. The display apparatus of claim 12, wherein the display control signal comprises an image control signal configured to rearrange an image displayed by the plurality of pixels according to the folding state.

17. The display apparatus of claim 12, wherein the display control signal comprises an image quality control signal configured to compensate for color coordinates or luminance of the plurality of pixels according to the folding state.

18. A display apparatus comprising:

a substrate including a display area and a peripheral area outside the display area, wherein the substrate is foldable about a first folding axis and a second folding axis which extend in a first direction across the display area;

a plurality of pixels in the display area;

a first voltage line in the peripheral area;

a plurality of second voltage lines in the display area and electrically connected to the first voltage line and the plurality of pixels;

a first sensing wire adjacent to the first folding axis in the display area;

a second sensing wire adjacent to the second folding axis in the display area;

a first connection wire in the peripheral area and electrically connected to the first sensing wire; and a second connection wire in the peripheral area and electrically connected to the second sensing wire, wherein a first end of the first sensing wire is electrically connected to the first voltage line, and a second end of the first sensing wire is electrically connected to the first connection wire, and a first end of the second sensing wire is electrically connected to the first voltage line and a second end of the second sensing wire is electrically connected to the second connection wire.

19. The display apparatus of claim 18, further comprising:

a display driving circuit configured to drive the plurality of pixels by using a vertical synchronization signal; and a sensing circuit electrically connected to the first connection wire and the second connection wire, and configured to detect a folding state of the substrate by comparing, during an on-voltage period of the vertical synchronization signal, a measured voltage of the first sensing wire with a first reference voltage, and comparing a measured voltage of the second sensing wire with a second reference voltage.

* * * * *